(12) United States Patent
Bailey et al.

(10) Patent No.: US 9,996,626 B1
(45) Date of Patent: Jun. 12, 2018

(54) SELECTION OF CONTENT ITEM RECOMMENDATIONS BASED ON USER SEARCH RESULTS

(75) Inventors: Jacob Daniel Bailey, Orinda, CA (US); Arun Mammen Thomas, Dublin, CA (US)

(73) Assignee: RICHRELEVANCE, INC., San Francisco, CA (US)

( * ) Notice: Subject to any disclaimer, the term of this patent is extended or adjusted under 35 U.S.C. 154(b) by 415 days.

(21) Appl. No.: 13/282,302

(22) Filed: Oct. 26, 2011

(51) Int. Cl.
*G06F 7/00* (2006.01)
*G06F 17/30* (2006.01)

(52) U.S. Cl.
CPC .............................. *G06F 17/30873* (2013.01)

(58) Field of Classification Search
CPC ................................................ G06F 17/30873
USPC ........................................................ 707/737
See application file for complete search history.

(56) References Cited

U.S. PATENT DOCUMENTS

| | | | |
|---|---|---|---|
| 6,601,075 B1 | 7/2003 | Huang et al. | 707/104.1 |
| 6,963,867 B2 | 11/2005 | Ford et al. | 707/3 |
| 2005/0289018 A1 | 12/2005 | Sullivan et al. | 705/27 |
| 2008/0109285 A1 | 5/2008 | Reuther et al. | 705/7 |
| 2008/0133497 A1* | 6/2008 | Kehl | G06F 17/30702 |
| 2008/0215416 A1 | 9/2008 | Ismalon | 705/10 |
| 2008/0288348 A1 | 11/2008 | Zeng et al. | 705/14 |
| 2008/0306819 A1 | 12/2008 | Berkhin et al. | 705/14 |
| 2009/0006216 A1 | 1/2009 | Blumenthal et al. | 705/26 |
| 2009/0216660 A1* | 8/2009 | Westphal | G06Q 30/02 705/26.1 |
| 2010/0121842 A1* | 5/2010 | Klinkott | G06F 17/30905 707/722 |
| 2010/0268661 A1* | 10/2010 | Levy et al. | 705/347 |
| 2011/0066497 A1* | 3/2011 | Gopinath | G06Q 30/02 705/14.53 |
| 2011/0161182 A1* | 6/2011 | Racco | 705/14.73 |

OTHER PUBLICATIONS

"Adsense," retrieved on Oct. 25, 2011, from http://en.wikipedia.org/wiki/AdSense, 6 pages.
"AdWords," retrieved on Oct. 25, 2011, from http://en.wikipedia.org/wiki/AdWords, 7 pages.
"Endeca Technologies, Inc.," retrieved on Oct. 25, 2011, from http://en.wikipedia.org/wiki/Endeca, 2 pages.

(Continued)

*Primary Examiner* — Van Oberly
(74) *Attorney, Agent, or Firm* — Seed IP Law Group LLP

(57) ABSTRACT

Techniques are described for selecting content items in various manners, such as by selecting product-related content items for display to consumer users. The content items may include advertisements or other promotional materials, and the selecting may be performed as part of determining particular promotional materials to display to particular users in particular situations, such as to accompany search results. In addition, the selecting of particular content items may be based on categorization of products indicated in search results and/or based on search terms used in searches performed on retail web sites. Particular content items are then selected based on the categorization, which may be for products distinct from those indicated in the search results, and may then be displayed with or otherwise in association with the search results.

39 Claims, 10 Drawing Sheets

(56) References Cited

OTHER PUBLICATIONS

"Find a $50 Version of Those $500 Shoes with Modista," retrieved on Feb. 27, 2009, from http://mashable.com/2008/12/11/modista/, 12 pages.
"Google Product Search," retrieved on Oct. 25, 2011, from http://en.wikipedia.org/wiki/Google_Shopping, 2 pages.
"Modista: browse for shoes and handbags by visual similarity," retrieved on Feb. 27, 2009, from http://www.modista.com/, 1 page.
"Modista: Jessica Bennett Fame," retrieved on Feb. 27, 2009, from http://www.modista.com/, 1 page.
"Modista: Women's Shoes," retrieved on Feb. 27, 2009, from http://www.modista.com/, 1 page.
"Omniture," retrieved on Oct. 25, 2011, from http://en.wikipedia.org/wiki/Omniture, 3 pages.
"Online Shopping for Shoes and Handbags," retrieved on Feb. 27, 2009, from http://www.ssaychic.com/fashion/modista-a-new-way-to-shop/, 5 pages.
"Superfish—Search by Sight," retrieved on Feb. 27, 2009, from http://www.superfish.com/, 1 page.
"JewelryViewer," retrieved on Feb. 27, 2009, from http://www.jewelryviewer.com/, 1 page.
"Want a Better Way to Search Amazon and eBay? Try PicClick," retrieved on Feb. 27, 2009, from http://mashable.com/2008/11/25/picclick/, 22 pages.

\* cited by examiner

SELECTION OF CONTENT ITEM RECOMMENDATIONS BASED ON USER SEARCH RESULTS

TECHNICAL FIELD

The following disclosure relates generally to selecting content items for display, such as by selecting product-related content items for display to users in particular situations.

BACKGROUND

In addition to providing access to information, the World Wide Web (also referred to as the "Web") has increasingly become a medium that is used to search for, shop for and order items (such as products, services and/or information) that are available for purchase, rent, lease, license, trade, evaluation, sampling, subscription to, etc. In many circumstances, a user may visit the Web site of a Web merchant or other online retailer that provides one or more items (sometimes referred to as a "Web store"), such as to view information about the items, give an instruction to place an order for one or more items, and provide information needed to complete the purchase (e.g., payment and shipping information). After receiving an order for one or more items, the online retailer then fulfills the order by providing the ordered items to the indicated recipient, such as by delivering product items electronically (e.g., music downloaded over the Internet) and/or through physical distribution channels (e.g., shipment via a governmental postal service or private common carrier, such as for paperback books). Similarly, some service items may be provided electronically (e.g., providing email service), while others may be provided physically (e.g., performing cleaning services at the purchaser's house).

While access to information about items via the Web provides many benefits, various problems also exist. As one example, given the large numbers of items that may be available from various online retailers, it can be difficult for a consumer user to identify particular items that may be of interest. In addition, it can be difficult for item providers to provide information about particular products to consumer users in appropriate situations.

DETAILED DESCRIPTION

Figure 1:
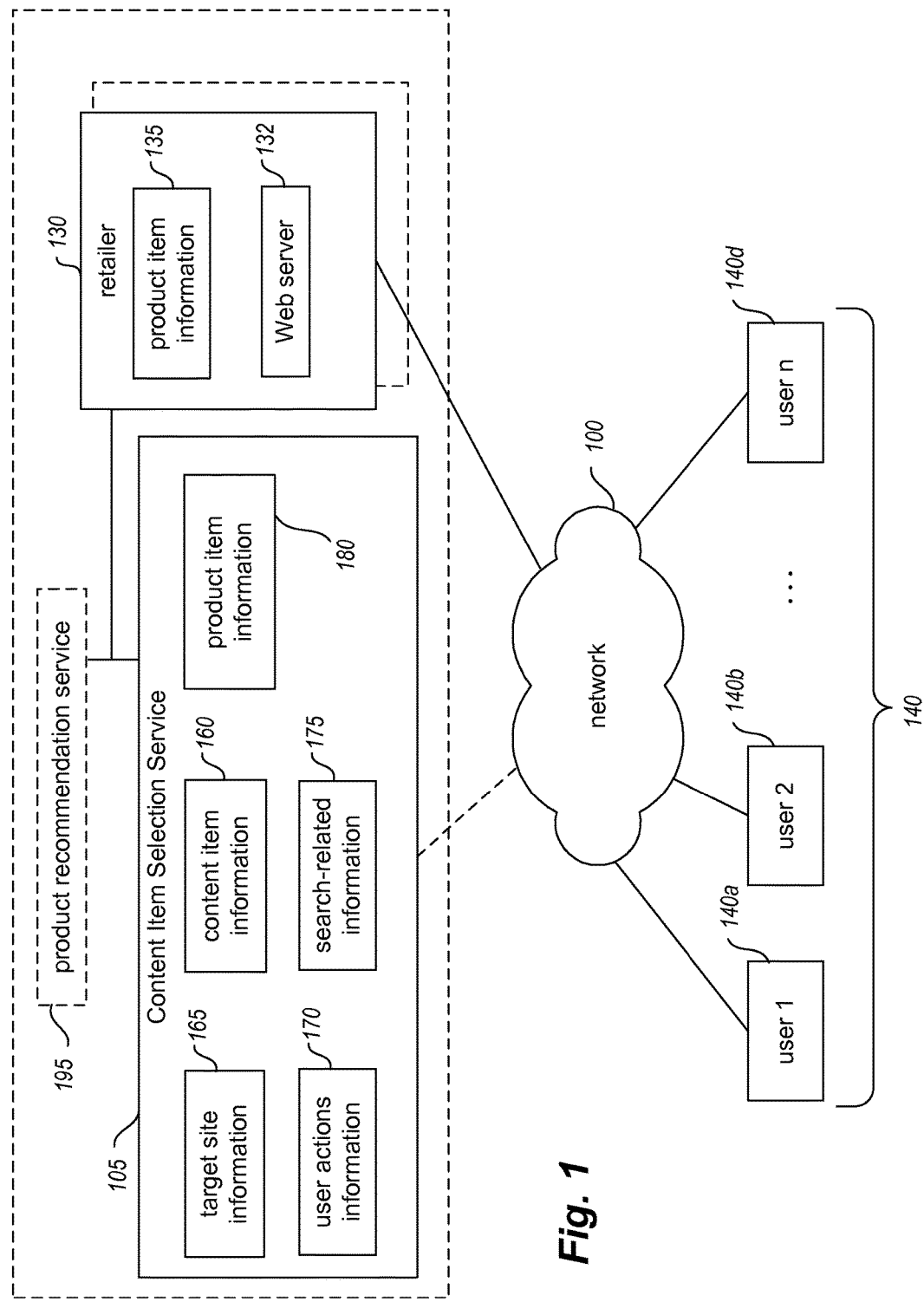
FIG. 1 is a network diagram illustrating an embodiment of a content item selection service for selecting content items based on search results.

Techniques are described for selecting content items to be used in various manners, such as in at least some embodiments by selecting product-related content items for display to consumer users based on search results for user searches. In some embodiments, the content items are selected for use with a particular search performed by a particular user, and are displayed to that user on the same electronic information page (e.g., Web page) as the search results for that search, or otherwise in proximity to or association with that search results information page—the selected content items may, for example, be related to or associated with additional products and/or services that are distinct from those indicated in the search results, but that are nonetheless related to the particular search performed by the particular user. In at least some embodiments, the content items include advertisements or other promotional materials, and the selecting of the content items is performed as part of determining particular promotional materials to display or otherwise present to users in conjunction with searches performed by the users. At least some of the described techniques are automatically performed in at least some embodiments by an automated computer-implemented Content Item Selection ("CIS") system that provides a corresponding CIS service.

The searches for which content items are selected and displayed may be performed electronically in various manners, including Web-based searches or any other electronic or database searches. In addition, the display or other presentation of the selected content items may also occur in various manners, including in some embodiments via Web sites or other electronic sites (e.g., as part of Web pages or other content served from those sites) of one or more online retailers or other online entities that are distinct from the CIS service and its provider. In some embodiments, such Web sites or other electronic sites may be associated with companies that are fee-based clients of the CIS service, such as for an online retailer that provides search results to users about products and/or services available for purchase or other acquisition from the online retailer, or other electronic sites that may provide other types of search results to users. In at least some of the following portions of the description, reference will be made to 'products', such as for content items that are associated with products and/or for search results that indicate products, but it will be understood that the described techniques may be used with other types of items and search results as well, including items that are services provided to users.

The selection of the one or more content items to accompany the search results for a particular search of a particular user may be performed in various manners in various embodiments. For example, in some embodiments, the search being performed may be automatically identified as being associated with one or more product categories (or other groupings of multiple related products), and content items are selected that correspond to one or more of those identified product categories. In such embodiments, the content items that are selected for a particular product category may be identified in various manners, as discussed in greater detail below, such as to select content items associated with the products that are most popular for that product category, with the products that are most highly rated for that product category, with the products that are most profitable for that product category, with products in that product category that are complementary for other products indicated in the search results for the current search, etc. In addition, after a product category is automatically identified as being associated with a search, information may be stored to associate that search with that product category (e.g., to store a mapping from one or more search terms of the search to that product category), and that stored association information may be later used to identify the associated product category(ies) for later searches that are similar or identical (e.g., that include some or all of the search terms included in a corresponding stored mapping).

The product categories that are used in a particular embodiment may have various degrees of specificity and be determined in various manners in various embodiments. In some embodiments, the product categories may include, for example, some or all of "consumer electronics", "music", "games", "movies", "books", "toys", "sports", "tools", "home", "garden", "grocery", "health", "beauty", "clothing", "shoes", "jewelry", "automotive", "appliances", "baby", etc. Alternatively, a higher-level category such as "entertainment" may be used that includes some or all sub-categories such as "books", "music", "games" and "movies", or a higher-level category such as "consumer electronics" may be separated into multiple lower-level categories such as "cell phones", "computers", "cameras", TVs", etc. It will be appreciated that various other categories may be used, including in some embodiments to have different categories for different target sites.

In addition, in some embodiments, the identifying of a product category as being associated with a search is performed independently from automated operations involved in selecting content items corresponding to one or more such associated product categories. For example, a product category that is automatically identified as being associated with a search by a user from an electronic information page may be associated with one or more of following, with information about the association optionally being stored for later use: the electronic information page that includes the search results for that search; the user or a user account of the user who performed the search; other electronic information pages associated with the user, such as based on interactions of the user with those other information pages or based on those other information pages being associated with an account of the user; etc. Once a product category is associated with an electronic information page, for example, that associated product category may be used to select content items to present on the electronic information page, which may be distinct from one or more other content items already present on the information page. As one example, if a user's past searches and/or other activities cause the user to be associated with a product category (e.g., based on frequency or volume of that user's recent activities corresponding to that product category), then subsequent new electronic information pages visited by the user (e.g., the home page of a new Web site) may be associated at least tentatively with that product category, and content items associated with that product category may be selected to be displayed on that new electronic information page when it is presented to the user and/or to other users—such an association of a product category with an electronic information page visited by the user may be made even for electronic information pages that may not otherwise be treated as being associated with a particular product category (e.g., a home page, a shopping cart page, an order confirmation page, etc.). Additional details related to tracking users' activities are included below.

An automated determination of one or more product categories that are associated with a search may be made in various manners in various embodiments, including by dynamically analyzing information about the products indicated in the search results for that search, and/or by analyzing information about actions previously taken by other users involving products after similar or identical prior searches.

Figure 2A:
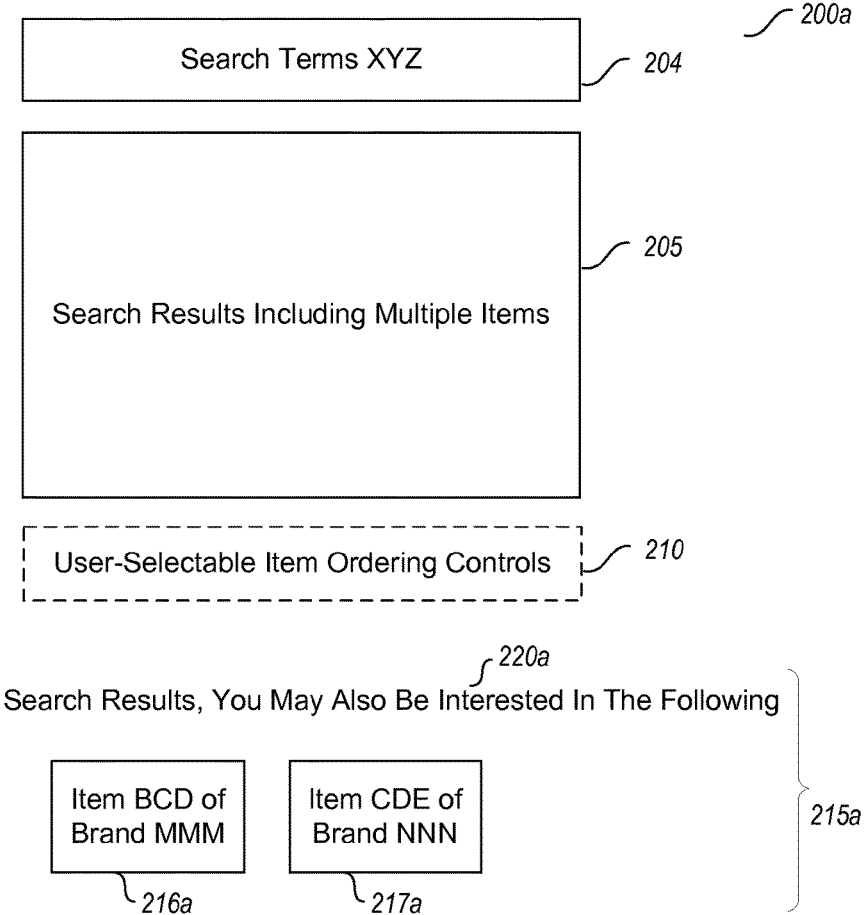
FIGS. 2A and 2B illustrate examples of selecting content items based on search results.
Figure 2A:
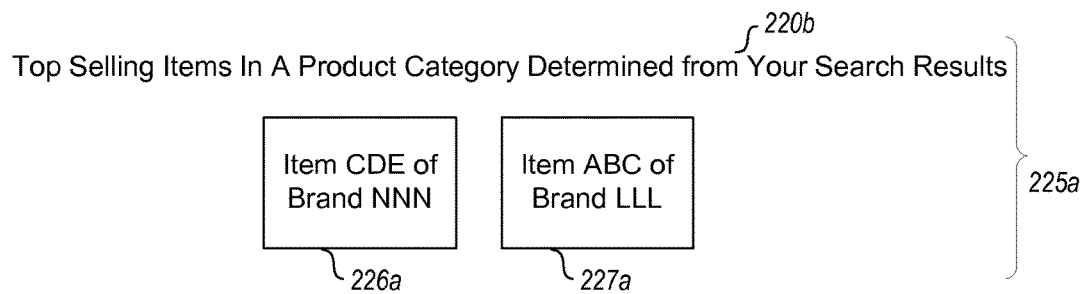

With respect to dynamically analyzing information about the products indicated in the search results for that search, if a third-party entity (e.g., an online retailer) receives the search request from a user and generates search results to display to the user, the CIS service may obtain information about those search results and use them to dynamically identify one or more product categories that are associated with those search results, such as based at least in part on information about the product categories of products indicated in the search results. The one or more product categories for the search results may be selected in various manners in various embodiments, including by selecting a product category of the majority of the products indicated in the search results or otherwise the most frequent product category of multiple products indicated in the search results, by aggregating sub-categories of multiple products into a common product category that includes some (e.g., a majority) or all of those products, etc. In addition, the selection of the content items may be based at least in part on analyzing metadata (e.g., product category information) obtained from the third-party entity about one or more of the products indicated in the search results, whether metadata that is received along with the search results or instead was previously received. The metadata may be information related to items including, but not limited to, brand, model, price, category, type, specifications, reviews, ratings, order history, cost, revenue generated, etc. The one or more product categories for the search results may be selected based on, for example, historical revenue, performance data or other financial data regarding the particular products or types of products indicated in the search results. This historical revenue data may include, but is not limited to, total revenue obtained from previous sales of specific products indicated in the search results, number of prior transactions including specific products indicated in the search results, profitability from prior sales of specific products indicated in the search results, prior sales trends of specific products indicated in the search results, etc. For example, one or more first categories associated with products indicated in the search results that have higher revenue or profitability than other products indicated in the search results may be selected as one or more categories of the search results in favor of one or more other second categories associated with the other products indicated in the search results. Such financial or performance data may also be used as one factor of many in determining the selection of one or more product categories for the search results. In some embodiments, the historical revenue, performance data or other financial data regarding the particular products may be included in the metadata as described above. FIG. 2A illustrates one example of such a content item selection technique based at least in part on analysis of search results, as discussed in greater detail below.

Figure 2B:
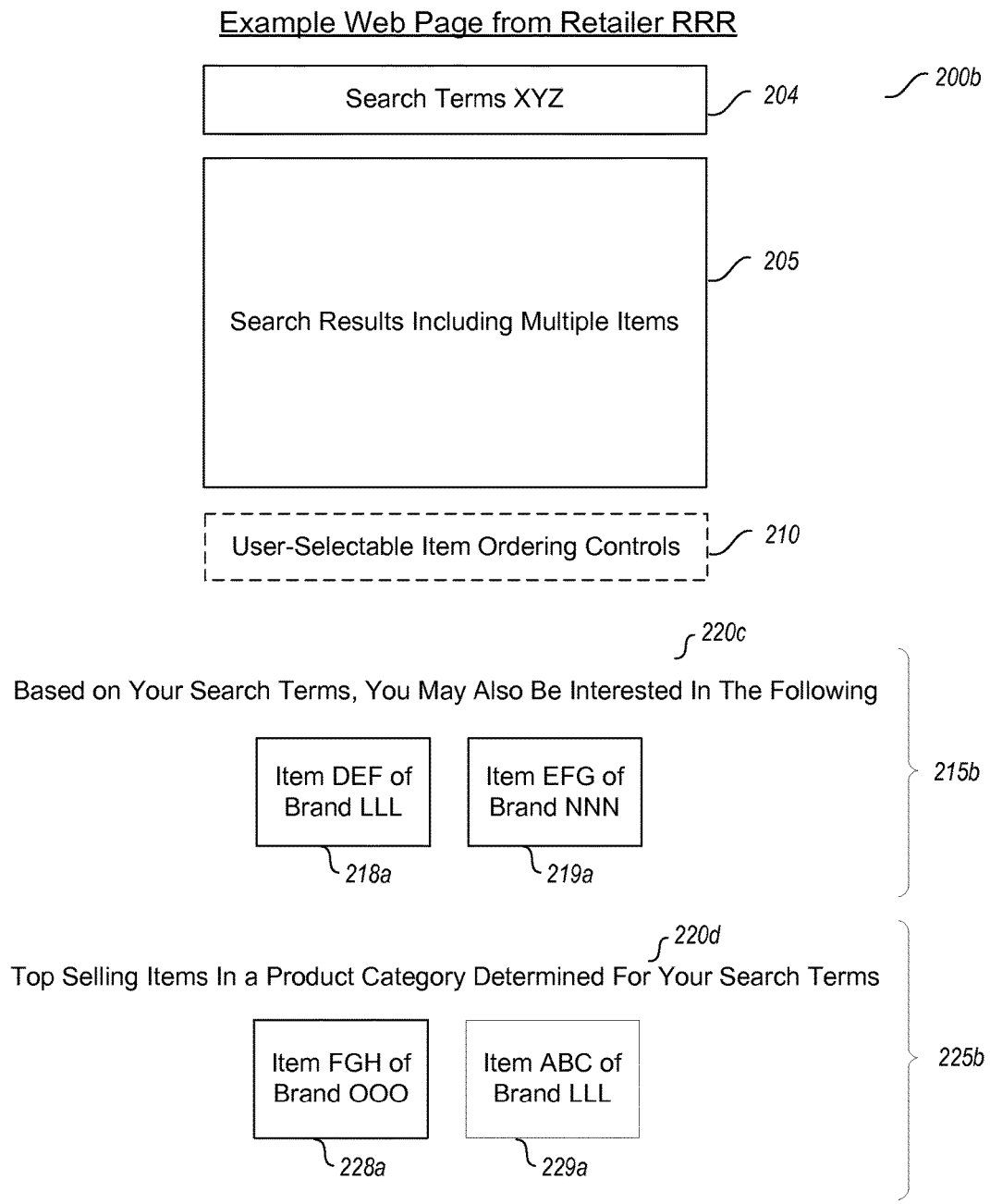

With respect to analyzing information about actions previously taken by other users involving products after similar or identical prior searches, for use in an automated determination of one or more product categories that are associated with a current search, the CIS service may at one or more times analyze such prior user activity information in various manners. For example, with respect to some or all search terms used by users in searches (or in some embodiments, for combinations of multiple search terms used together), the CIS service may track subsequent online actions by those users related to particular products and with respect to one or more metrics of interest, such as with respect to products that are viewed by those users (e.g., by selecting corresponding links or other information in the search results that are provided to those users), to products that are ultimately purchased by those users, etc. In at least some such embodiments, the tracking of user activities may be constrained in one or more manners, such as for user actions that occur within a defined period of time after a user search, that occur within a single user session of related interactions with a particular entity, that occur until another search is performed by the user, etc. In addition, in some embodiments, the user actions that are tracked after a search may not be limited to user interactions with the search results, but may include other online selections that the user makes instead of further interacting with the search results (e.g., to browse a selected product category having multiple related products, to select a displayed content item corresponding to a product that is not part of the search results, etc.), and in some embodiments may include at least some types of offline actions (e.g., purchasing a product in a physical brick-and-mortar store). After one or more relevant products are identified based on such prior user actions (e.g., products that are viewed, purchased, part of a browsed category, correspond to a selected content item, etc.), such identified relevant products may be used to identify one or more associated product categories in various manners, including in a manner similar to that discussed with respect to analyzing products indicated in search results. When a search is later received that includes some or all of those search terms for which associated product categories were previously determined, those product categories may be automatically selected for that search. FIG. 2B illustrates one example of such a content item selection technique based at least in part on analysis of prior user actions, as discussed in greater detail below.

As previously noted, in at least some embodiments, the content items include advertisements or other promotional materials, such as for particular items, brands and/or related companies (e.g., item manufacturers, distributors, wholesalers, resellers, etc.), and may in some such embodiments be supplied by or otherwise indicated by other particular clients (e.g., by one or more of the related companies for particular product items and/or service items that the companies provide). In addition, such content items may have various forms, such as for a particular content item to include one or more of text, one or more images, one or more videos, one or more audio clips, one or more user-selectable controls, one or more associated operations to be performed in response to particular actions by users to whom the content item is presented (e.g., by the user clicking on or otherwise selecting the content item), etc.

As one example, in some embodiments and situations, instructions from a particular client (e.g., an online retailer) may be received by the CIS service to provide advertisement content as part of Web pages provided by that client to users that include search results for searches performed by the users. After the receiving of the instructions, a request is received by the CIS service for advertisement content to be displayed to an indicated user of the client as part of a search results Web page that includes search results generated by the client. The search results may indicate one or more products available for purchase from the online retailer, and may be generated in response to one or more search terms included in the search request. One or more product categories associated with the one or more search terms of the search request are then determined in one or more manners. The CIS service automatically identifies one or more additional products to recommend to the indicated user as part of the search results Web page. In at least some such embodiments, the additional products are distinct from the indicated products in the search results and are part of at least one of the determined associated product categories. The CIS service then automatically selects one or more pieces of advertisement content to be displayed to the indicated user as part of the search results Web page, and initiates the display of the selected content items (e.g., by sending one or more electronic communications that include information about the selected one or more pieces of advertisement content). The one or more pieces of advertisement content provide information about the one or more additional products. If the content item is presented to a consumer user in such situations, the content item may influence the consumer user to subsequently purchase the particular item that is associated with the presented content item (e.g., the consumer user may immediately click or otherwise select the presented content item and receive additional information about the associated item, such as to prompt to consumer user to proceed to purchase the associated item; the consumer user may later decide to purchase the item associated with the presented content item, such as in an offline manner at a brick-and-mortar retailer; etc.). Additional details related to particular content item selection techniques and related uses are included below.

As previously noted, content items may include promotional materials or other types of information that are selected by the CIS service and may be displayed to users on a target site on the same information page (e.g., Web page) as (or otherwise in proximity to or in a manner associated with) the search results provided by an online retailer. In addition, the selected content items may in some embodiments be provided by the CIS service directly to the users (e.g., as part of electronic communications that include one or more Web pages of a Web site provided by the CIS service, as part of HTML-based email electronic communications sent by the CIS service, etc.), or are provided by the CIS service for display with other information from one or more other third-party target sites that do not include search results (e.g., as part of electronic communications that include one or more Web pages of a Web site provided by those other target sites, as part of HTML-based email electronic communications sent by those other target sites, etc.), including with information that is provided to a user after a search by the user (e.g., in one or more Web pages following an initial search results Web page that includes the search results). The target sites may have various forms in various embodiments, such as from the following non-exclusive list: online retailer Web sites (e.g., which may each provide numerous Web pages that are each specific to one or more particular items, such as to enable consumer users to purchase those items from the site); other non-retailer Web sites that include information about particular items (e.g., review or opinion sites, encyclopedia or other general knowledge sites, search engines that include item information in search results, etc.); other Web sites that include information that is not specific to particular items (e.g., general news sites); and other electronic sites that are accessible in manners other than via the Internet (e.g., an application store or other electronic marketplace that is provided by a cellular telephone network provider and is accessible by devices connected to the cellular network; an electronic store or other marketplace that is provided to users of a specialized type of computing device, such as game consoles connected to a manufacturer-provided electronic store; etc.). In addition, while one or more selected content items may in some embodiments be provided to a user via an electronic communication that includes an HTML-based Web page, in other embodiments other types of electronic communications may be used to provide one or more selected content items to a user, such as an HTML-based email electronic communication, an electronic communication that includes a page of information that is not based on HTML (e.g., a Web page specified using another markup language or data format, an email specified using another format, a Multimedia Messaging Service message or similar communication, a multimedia-based chat or instant message communication, etc.).

When users interact with multiple Web pages or other electronic information pages that are part of a target site, whether as part of a single session using a single user device or as part of multiple sessions lasting an extended period of time (e.g., hours, days, weeks, months, years, etc.) and involving one or more user devices, the CIS service and/or a provider of that target site may in some embodiments track the user's interactions with the target site and other related user actions. The CIS service may then use such tracked information in at least some embodiments when selecting particular content items to display to that user or other users, including in some embodiments and situations to associate one or more product categories with a user based on the user's past activities. For example, the tracked information for one or more users may be used to categorize the search terms used in searches and/or the search results of the searches, such as when the tracked information is related to products indicated in the search results of those searches, or is related to products that are otherwise selected by users after the searches. In some instances, a category may be considered to be linked strongly with a search term if many users bought a product within the category after using the search term (e.g., via a link provided in the search results, or a separate link on a Web page in which the search results were provided). If one or more of the search terms is used again (e.g., by the same or other users), then content items may be selected based on the categories of these search terms, whether in addition to or instead of being based on the new search results received from using the same search terms. In addition, when the target sites that the CIS service interacts with include multiple different sites (e.g., multiple partner or affiliate sites, such as from one or more distinct corporate entities; multiple unrelated sites from multiple distinct entities; etc.), the CIS service may similarly in some embodiments track users as they interact with different target sites (e.g., in a related manner, such as sequentially during a single interaction session; or in an unrelated manner, such as at different times and/or from different computing devices), including to use information about the user's interactions with one or more prior other target sites to affect the current content items that are selected for users at the current target site when they perform searches.

In at least some embodiments, the tracked information of a user as described above may be used to categorize one or more electronic information pages of a target site (or parts of such pages) that are not search results pages. In some embodiments, the tracked information may include information related to or obtained as a result of a search performed by the user, and in other embodiment may not include such information. This categorization of an electronic information page may be used to select one or more content items for display or other presentation on the information page, such as to select content items corresponding to a product category (e.g., with one or more products in that product category) that is associated with the information page. The one or more categorized electronic information pages may include those that otherwise have no current associated category, or in other embodiments may include information pages that already have one or more other associated categories that are to be replaced or supplemented. Examples of various types of electronic information pages that may be categorized include, but are not limited to: a home page, a welcome page, a shopping cart page, a shopping complete page, a checkout page, a help page, a "contact us" page, an "about us" page, a product listing page, a product catalogue page, a promotional page, a user profile page, a user account information page, an account maintenance page, etc.

As one non-limiting example, if the tracked information indicates that the user interacts with the target site or other web site in a manner that indicates the user would be generally interested in electronics, the CIS service may use this information to categorize one or more other electronic information pages unrelated to a search results page as being in the consumer electronics category. The CIS service may then select particular content items corresponding to the consumer electronics category to display to that user when that user visits or otherwise interacts with one or more of the other such electronic information pages.

As previously noted, the selected content items may in some embodiments be provided by the CIS service directly to the users (e.g., as part of electronic communications that include one or more Web pages of a Web site provided by the CIS service, as part of HTML-based email electronic communications sent by the CIS service, etc.), or instead may be provided by the CIS service for display with other information from one or more other third-party target sites. For example, the selected content items may be provided with electronic information pages of such third-party target sites that do include or do not include search results, including with information that is provided to a user after a search by the user (e.g., in one or more Web pages following an initial search results Web page that includes the search results).

The target sites may have various types of contractual relationships or other affiliations with the CIS service, including arrangements in which the target sites are paid by the CIS service for allowing selected content items to be presented on their sites and/or in which the CIS service is paid by the target sites for selecting and providing content items to be presented on their sites. For example, in embodiments in which at least some of the content items include promotional materials, the CIS service may operate as part of a service that provides advertisements for display on one or more target sites (e.g., on item-related pages provided by an online retailer target site, on search results pages provided by a search engine target site that include item-related information and/or any type of information, etc.), or the CIS may otherwise be affiliated with one or more such advertisement-providing services. In addition, in at least some such embodiments, the content item selection techniques of the CIS service may operate in conjunction with other techniques for selecting advertisements for display (e.g., pay-per-click or pay-per-view systems, such as based on bids supplied by advertisers), such as to supplement, adjust and/or replace the other advertisement selection techniques.

In some embodiments, the tracked information of a user as described above may be used to assign or associate one or more product categories with the user. This information may be aggregated by the CIS service or other third-party service to create one or more groups of users, with users in each group having the same or related categories. Individual users within these user groups may be identified to various third-party entities, including one or more of the following: advertiser clients of the CIS service; an advertisement-providing service; a brand advertiser; multiple partner or affiliate sites, such as from one or more distinct corporate entities; multiple unrelated sites from multiple distinct entities; manufacturers of product items with which the content items are associated; other advertisers who provide content items associated with particular product items or service items; one or more other sites that a user interacts with after visiting a target site; etc. These various third-party entities may include particular companies or other entities that desire to, for example, promote particular content items corresponding to a particular product category to one or more of these users groups that are associated with that product category, such as while users in those user groups visit or otherwise interact with various target sites or other sites. These various entities may have contractual relationships or other affiliations with the CIS service such that information that identifies user groups associated with particular categories may be provided exclusively or non-exclusively to particular entities based on these contractual relationships. The entities supplied with such information may, for example, identify entire audiences or groups of users that are associated with a particular category, to enable them to present targeted advertising related to the particular category as users of the group visit or otherwise interact with various sites (e.g., after the users have left one or more target sites affiliated with the CIS service).

The selecting of particular content items in particular situations may in some embodiments be performed based at least in part on campaigns or other information specified by advertiser clients of the CIS service. Such clients may, for example, include particular companies or other entities that desire to promote particular content items (e.g., manufacturers of product items with which the content items are associated, other advertisers who provide content items associated with particular product items or service items, etc.). In at least some embodiments, such a client may specify one or more criteria that indicate particular situations in which one or more particular content items are desired to be presented, with such criteria optionally including fees that the client has paid and/or is willing to pay to promote visibility of particular content items in those particular situations. A non-exclusive list of criteria and related information for a campaign includes the following, with a particular client able to specify one or more such information types in at least some embodiments: restrictions on the product/service items for which associated content items are allowed to be presented as part of the campaign (e.g., based on particular product/service items; or based on product/service items that have specified attributes, such as a specified brand affiliation, a specified manufacturer, minimum and/or maximum price, a minimum and/or maximum number of user reviews, a minimum and/or maximum average rating from users, a minimum and/or maximum recommendation relevance or other evaluation score from other targeted recommendation strategies or techniques, etc.); restrictions on which content items are allowed to be presented as part of the campaign (e.g., based on particular content items, based on content items that have particular specified attributes, etc.); particular content items or other information to be displayed with selected content items (e.g., a company or brand logo; a GUI skin; text or other information to be displayed along with one or more content items selected based on the campaign, such as in place of other default text or other information that would otherwise be selected; etc.); restrictions on particular target site uses with which the campaign may be used (e.g., particular target sites; target sites that have particular attributes; particular conceptual portions of target sites, such as particular categories, types or genres of product/service items; particular structural locations within the target sites, such as the Web site home page versus particular item-specific pages; particular parts of a target site Web page; etc.); restrictions on when and/or how often content items are selected and used based on the campaign (e.g., a specified duration of the campaign; particular time periods during which the campaign is active; a maximum and/or minimum number of times to display content items for the campaign; a maximum or minimum or target probability that a content item will be selected for the campaign if the content item qualifies as being available for selection based on the campaign; etc.); one or more prices that the client is willing to pay for one or more selections and uses of a content item as part of the campaign (e.g., a specified per-use price or price for a specified number of uses; minimum and/or maximum such prices; a price for a specified duration or other period of time, such as a daily maximum or a lifetime cap; etc.); etc. In addition, embodiments of the CIS service may enable clients to specify campaign-related criteria in various manners in various embodiments, including to provide a corresponding GUI in at least some embodiments to enable clients to interactively specify particular criteria (e.g., as part of an account that a client establishes with the CIS service), and/or to provide one or more programmatic interfaces (e.g., Web services APIs, or application programming interfaces) to enable software programs of clients to programmatically specify particular criteria. Such specified campaign-related information may be used in various manners in various embodiments, such as to influence which content items are selected for a particular product category that has been determined to be associated with a particular search.

The content item selection techniques of the CIS service may in some embodiments operate in conjunction with other techniques for selecting advertisements for display, such as product/service item targeted recommendation strategies that are used to evaluate the relevance of particular product/service items to recommend to particular users in particular situations. For example, such product/service targeted recommendation strategies may in some embodiments be based at least in part on data regarding prior interactions of numerous users with numerous items, such as the aggregate interactions of customers of one or more retailers related to products or other items that are available from those retailers, or instead may be based on interactions of other types of users in other situations (e.g., users who perform searches with search engines, users who view information about products from a product review service, etc.). In addition, in at least some embodiments, such product/service targeted recommendation strategies that are used for a user may be based at least in part on prior actions by that user (e.g., the user's browsing history, particular interactions of the user with particular target sites and/or content items and/or product/service items, etc.), whether instead of or in addition to targeted recommendation strategies based on data regarding prior interactions of numerous users with numerous items, and whether instead of or in addition to categorization of search results or search terms based on data regarding prior actions of users related to products indicated in the search results. A non-exclusive list of types of actions of customers of online or other retailers with items for which interaction data is gathered may include, for example, the following: performing searches (e.g., for particular items, for items of a particular category or other defined group of items, for items having one or more indicated attributes, etc.); browsing item categories; following hyperlinks related to items and otherwise viewing detailed information about particular items; purchasing items; doing item returns; etc.

The interaction data about the prior user actions with items may be analyzed and summarized in various ways, such as, for example, in the following non-exclusive manners: to identify items that are popular (e.g., the top item sellers in a particular category or from a particular retailer during a particular period of time; the items that are most often selected by users, such as to view detailed information about the items; the items with the highest user ratings; the items most often included in results of users' searches and/or selected by users from such search results; the "hottest" items of an item group to reflect those items having the largest changes in their ratings or sales or other popularity measure during a particular period of time; etc.); to identify items that are similar to each other (e.g., items that have similar or otherwise related items attributes, such as price, type, size, etc.) or are otherwise related to each other (e.g., users who viewed this item are most likely to also view these other items; users who viewed this item are most likely to purchase these items; users who purchased this item are most likely to also purchase these other items; users who searched for this item attribute and/or browsed this item category are most likely to view and/or purchase these items or items with these attributes or items in these categories; etc.); to identify items that are popular among users similar to a user for whom targeted recommendations are being made (e.g., users with similar demographics; users in the same or nearby geographic regions, etc.); to identify items that have been explicitly associated with one another, such as by a retailer, an advertiser, a manufacturer, and/or another user (e.g., "buy together" items); to identify items that are similar or otherwise related to items interacted with by a particular user, such as a user to whom targeted recommendations are to be provided (e.g., interactions related to items purchased by the user, items viewed by the user, items added to a shopping cart of the user, etc.); etc. Some or all of the various types of analyzed or summarized user interaction data may then each be used for selection of content items to include with search results, as well as to assist in categorization of search results or search terms based on user interaction data regarding prior interactions of users related to products indicated in the search results.

In addition, multiple recommendation strategies may be used together in various ways in various embodiments. For example, in some embodiments and situations, recommendation results from multiple available targeted recommendation strategies may be gathered for a particular situation involving a particular user or a particular search, and then those various targeted recommendation results may be aggregated in various manners. As one example of aggregating various recommendation results from multiple recommendation strategies, the various recommendation results may be weighted or otherwise ranked, so as to determine relevance scores or other relevance levels for those recommendation results, and then some or all of those various recommendation results may be selected to be used as recommendations for that user based on those weightings or other rankings. The weighting or other ranking of various item recommendation results may be performed in various manners, such as based on a weighting or ranking provided by a particular recommendation strategy that recommended the item (e.g., with a top sellers recommendation strategy weighting the highest item seller as the top recommendation for that strategy, and progressively weighting lower sellers as lower recommendations), based on inclusion of a particular item recommendation in the results from multiple different recommendation strategies, etc. In other embodiments, relevance scores or other levels may be determined for particular recommended items in manners other than based on weighting or other ranking. In addition, in other embodiments, a particular one of multiple available recommendation strategies may instead be selected for use in a particular situation, such as based on a dynamic determination that the particular recommendation strategy is optimal or otherwise preferred for the particular situation, or instead based on a prior selection or configuration to use that particular recommendation strategy in that particular situation (e.g., based on prior configuration by a human operator, based on a prior automated selection of that particular recommendation strategy, etc.). A dynamic determination to use a particular recommendation strategy at a given time based on a current situation may be based on, for example, a comparison of the results from the recommendations of that particular recommendation strategy to recommendation results from one or more other possible recommendation strategies, a failure or other inability of other possible recommendation strategies to provide useful recommendation results or any recommendation results, etc. Additional details related to example embodiments of using various recommendation strategies are included in co-pending U.S. patent application Ser. No. 12/415,896, entitled "Multi-Strategy Generation of Product Recommendations" and filed Mar. 31, 2009, which is hereby incorporated by reference in its entirety.

In some embodiments, one or more targeted recommendation strategies are used to evaluate content items in one or more manners (e.g., based at least in part on product/service items with which the content items are associated) and to determine particular content items that are alternatives for selection and use (e.g., based at least in part on the evaluation scores), and the content item selection techniques of the CIS service are then used to select a subset of those determined alternative content items for actual use. For example, the CIS service (or a related product/service item targeted recommendation service) may determine a first group of one or more content items that are initially the primary candidates for selection and use (e.g., the top five content items according to a specified evaluation scheme), may determine a second group of one or more other content items that are alternative candidates rated below the primary candidates of the first group (e.g., the next five content items according to the specified evaluation scheme), and optionally may determine a third group of one or more further other content items that are rated below the content items of the second group (e.g., if the content items of the second group are selected to be above a specified minimum threshold, and content items that are not above that minimum threshold are placed in the third group, such as all content items below the top ten in this example). In some such embodiments, the described content selection techniques of the CIS service may be used to identify alternative candidate content items from the determined second group that will be selected and used (e.g., in place of primary candidate content items from the determined first group), such as based on those identified alternative candidate content items satisfying the criteria for one or more specified campaigns, but may not identify content items from the determined third group to be selected and used. In other embodiments, the described content selection techniques of the CIS service may be used to identify content items that will be selected and used regardless of whether those content items are part of the second group or third group (e.g., regardless of whether those content items have at least a minimum specified degree of relevance), such as if one or more of the selected content items are from the determined third group, or if one or more content items are selected without determining at least one of the described first, second and third groups.

In other embodiments, the CIS service may more generally perform a costs-benefits analysis with respect to particular content items promoted by particular client campaigns and other possible content items that may be selected, with the analysis being based on a monetary performance metric or other key performance indicator ("KPI") performance metric. Such KPI performance metrics may include, for example, impact to revenue for a target site, impact to user return visits to a target site, impact to user visit to landing page of a target site, or any other measurable indicator of performance. For example, using one or more product/service item targeted recommendation strategies, a group of one or more content items may be selected for use in a particular situation, such as 5 content items that are advertisements corresponding to the 5 top-selling products in a particular category. A determination may also be made of the expected impact to a chosen KPI of presenting each of these 5 content items to a consumer user in a particular situation. For instance, if a monetary performance metric such as impact to revenue is the KPI under consideration, the expected monetary impact may be estimated by using expected click-through rates and conversion rates of consumer users who select a particular such content item (e.g., the fourth-highest top selling product) and proceed to purchase the product/service item to which the content item corresponds, along with a corresponding profit margin for the product/service item (e.g., an average profit margin for products/services in this category, an actual profit margin for the specific product/service item to which the content item corresponds, etc.)—such a determination may, for example, represent an expected monetary value to a particular target site of displaying a particular content item in a particular manner, and/or may represent a value to the CIS service of displaying a particular content item in a particular manner. However, a particular client of the CIS service may have specified a campaign that alters the costs-benefit analysis for the content item(s) that are part of the campaign, thus altering the group of content items that may be selected for use in a particular situation. For example, consider the case of a particular alternative content item that is part of a campaign and is associated with a particular product/service item, with the associated item being evaluated to be the seventh top-selling product in a particular category—displaying this alternative content item in place of a content item associated with the fourth-highest top selling product for the category in a particular situation may result in a lower expected value from the display (e.g., a lower monetary expected value, such as based on the alternative content item for the seventh-highest top selling product having a lower expected click-through rate and/or conversion rate relative to the content item associated with the fourth-highest top selling product, based on the seventh top-selling product having a lower profit margin than the fourth-highest top-selling product, etc.; or a lower expected value with respect to one or more other KPIs, such as by assigning a monetary value to a change in user return visits to a target site or to user visits to a landing page of a target site)—however, if the client is willing to pay a sufficient fee for such a display associated with the campaign (e.g., a fee that is greater than the difference between the expected values of displaying the content items for the fourth-highest and seventh-highest top selling products), the costs-benefits analysis may instead determine that the overall expected value of displaying the alternative content item for the seventh-highest top selling product is greater than that from displaying the content item for the fourth-highest top selling product (after the campaign-related fee(s) are considered). In such a situation, some or all of the greater overall expected value may be provided to the target site on which the content item display occurs and/or some or all of the greater overall expected value may be retained by the CIS service. Conversely, if a different second content item is associated with a different second campaign, but the product/service item with which the second content item is associated has a lower determined recommendation relevance value (e.g., is the fiftieth-highest top selling product in the particular category), the fee that a client is willing to pay for this second campaign is less likely to be sufficiently high to cause the expected value from using this second content item in place of the content item for the fourth-highest top-selling product to exceed the expected value from using that content item for the fourth-highest top-selling product, but in some embodiments and situations may nonetheless be sufficiently high to cause a greater overall value to be achieved from the selection and use of the second content item in place of the content item for the fourth-highest top-selling product (or some other of the 5 top-selling product/service items in a particular category).

It will be appreciated that the determination of whether and when to select and use particular content items based on particular search results, search terms, user behavior and known product data may be made in other manners in other embodiments, as discussed in greater detail elsewhere.

FIG. 1 is a network diagram illustrating an embodiment of a content item selection service that is configured to select content items based on search results. With respect to at least some embodiments below, the discussion may refer to selecting content items associated with search results and displaying those selected content items to users, but it will be appreciated that the same or similar techniques may be applied to other types of items and for other types of uses in other embodiments.

The illustrated example of FIG. 1 includes a number of example users 140 that are each interacting with one or more Web sites or other target sites 130 over one or more intervening networks 100, such as to obtain Web pages or other electronic information pages (e.g., HTML-based emails, or other groups of information that are formatted at least in part based on HTML, or HyperText Markup Language, or based on other related formats or markups) from those target sites 130 and to optionally engage in commerce activities with those target sites 130. In particular, in this example, some or all of the example target sites 130 may be provided by one or more online retailer businesses that sell or otherwise make products or other items available to customers or potential customers, such as via a Web site (e.g., a Web store) or other network-based service hosted on one or more server computing systems, with Web server software 132 providing Web pages of the Web site. For example, the users 140 may access a Web site 130 of a retailer to obtain one or more Web pages, such as to view information about, search for, browse for, rate, place an order for, and/or provide information for completing a purchase of or a return of one or more products or other items available from the retailer, such as based on product item information 135 stored by the site 130. As discussed in greater detail elsewhere, the information provided to the users 140 from the retailer target sites 130 may include content items selected by the service 105, with FIGS. 2A and 2B providing examples of types of content item selections and uses that may be provided in some embodiments. In addition, in at least some such embodiments, information about various of the interactions of the users 140 with one or more retailer Web sites 130 may be collected and included as part of user actions information 170 by the service 105, such as interactions of the users (e.g., product views, purchases, returns, ratings) that are related to the products or other items made available on the retailer Web sites 130 (e.g., products or other items indicated in search results on the retailer Web sites 130). In other embodiments, some or all of the users 140 may obtain displayed or otherwise presented information from target sites 130 in manners other than via personal computing devices of the users, such as if those users are at a physical retail location and interact with one or more publicly accessible device(s) at the physical retail location (e.g., a fixed-location kiosk provided by the retailer, a mobile wireless device belonging to the retailer, etc.) in order to view and/or interact with selected content items from the service 105 as well as product information and related content from the retailer. In at least some embodiments, the user actions information 170, and more generally the information about users that is used by the CIS service, is limited to information about the interactions of the users with the CIS service, interactions with or other state of one or more client devices of the user, and/or interactions with the retailers 130 (or other sites with affiliated relationships with the CIS service), and does not include information about other actions of users on the Internet or otherwise.

As part of providing Web pages to users, the target sites 130 in this example have previously established an affiliation (whether directly or indirectly) with an example embodiment of a Content Item Selection ("CIS") service 105 and/or with one or more other optional product/service item recommendation services 195 (e.g., services that provide targeted product recommendations for particular users and/or particular situations), so that the services 105 and/or 195 may select and provide content items (e.g., content items associated with particular online search results or online search terms) for display on at least some of the Web pages or other information pages provided by the target sites 130 to the users (e.g., for display with or in proximity to online search results). The interactions between a target site, a user, a client device of a user, the CIS service 105 and the other services 195 may occur in various manners in various embodiments, such as for a target site to request the selection of one or more content items for presentation to one or more users, for a user's computing device to request one or more selected content items for presentation to the user (e.g., for display to the user as part of a search results Web page), etc. In addition, a particular target site 130 may interact with only one of the service 105 and a service 195 in some embodiments, with that service interacting as appropriate with the other service before responding to the target site 130. Alternatively, the target site 130 may interact with both of the service 105 and the service 195, the service 105 and the service 195 may in some embodiments be integrated as a single service, or the optional other services 195 may not be used. In yet other embodiments, the service 105 may have other forms, such as to be included as part of a particular target site 130 (e.g., to provide the described content item selection techniques for that target site on behalf of its users). In addition, in some situations and embodiments, some or all of the users 140 may optionally interact directly with the CIS service 105, such as to request and receive particular selected content items from the CIS service 105 (e.g., based on a request initiated by the user; based on a request initiated by a Web page provided to the user from a target site 130, such that display or other presentation of the Web page on a computing device, not shown, of the user causes the request; etc.).

In this example, the network 100 is a publicly accessible network of linked networks, possibly operated by various distinct parties, such as the Internet, although in other embodiments the network 100 may have other forms. For example, the network 100 may instead be a private network, such as, for example, a corporate or university network that is wholly or partially inaccessible to non-privileged users. In still other embodiments, the network 100 may include both private and public networks, with one or more of the private networks having access to and/or being accessible from one or more of the public networks. Furthermore, the network 100 may include various types of wired and/or wireless networks in various situations. In this illustrated example of FIG. 1, the users 140 may each use computing systems and/or devices (not shown) to interact with the target sites 130 and optionally the service 105 to obtain various described functionality via the network 100, and in doing so may provide various types of information to the service 105.

In addition, some of the users 140 (or other users, not shown) may interact directly with the service 105 on behalf of clients of the service 105, such as to specify instructions or requests to provide advertisement content based on search results performed by other users as part of Web pages provided to the other users that include the search results. Such interactions of users with the service 105 may occur in various ways in various embodiments, such as, for example, in an interactive manner via a GUI that is provided by the CIS service 105 and displayed on computing systems and/or other devices of those users 140, or in a programmatic manner via an API ("application programming interface") provided by the CIS service 105 that allows computing systems and/or programs to invoke such functionality programmatically, such as using Web services or other network communication protocols.

In this illustrated example, the service 105 and/or recommendation service(s) 195 have access to information about various content items that are available for display via the target sites 130, such as may be included as part of the content item information 160 of the service 105 and/or other similar information (not shown) of the service(s) 195. Such information 160 may include some or all of the actual content items that will be selected and then provided by the service 105 (e.g., as previously received from clients) and/or may include information about content items to enable the described content item selection techniques to be performed, but with the actual content items stored elsewhere (e.g., by the target sites 130; on the computing devices of the users 140; on other network-accessible computing or storage systems of the clients or others, not shown; etc.). Some or all of the content items in this example may be advertisements related to products available from the retailer target sites 130, although in other embodiments and situations, some or all of the content items may not correspond to products available from the retailer target sites 130 (e.g., may be advertisements for other products or services, such as other products/services that are competitors to or complementary to products/services available from the retailer target sites 130, or instead may be one or more types of non-advertisement information).

In addition, in this example, the service 105 includes additional information to enable the described content item selection techniques, including information 165 specific to particular target sites (e.g., information about particular target site Web pages, other information pages, or other locations on which selected content items may be displayed), search-related information (e.g., search terms and/or search results) 175 related to searches performed by consumer users via one or more retailer target sites 130; historical user actions information 170 (e.g., information that may be used to categorize one or more search terms by using user actions information about products related to the search terms); and product item information (e.g., obtained product category and other metadata information for products). For example, after a determination is made of one or more search categories that are associated with one or more search terms, a mapping of that association may be stored as part of the information 175. In addition, the product item information 180 may be obtained by the service 105 from a database and/or other data collection related to a catalog of product items and/or service items available from one or more retailer target sites 130 (e.g., descriptions, product categories, prices, availability and other information about the products and/or services). Furthermore, when content items are configured to be displayed in one or more particular manners (e.g., a separate window of defined size and/or shape, with particular locations for particular types of content, etc.), the information about those particular manners may be stored by or otherwise accessible to the CIS service, such as to be stored with the target site information 165 if specific to one or more particular target sites and to be stored with the content item information 160 if tied to specific content items, etc. Additional details related to selection of particular content items are included elsewhere.

For illustrative purposes, some embodiments are described below in which specific types of content item selections occur and are used in specific manners to provide users with specific types of information for specific types of products in specific types of situations. These examples are provided for illustrative purposes and are simplified for the sake of brevity, and the inventive techniques may be used in a wide variety of other situations, some of which are discussed below, with the techniques not being limited to use with particular types of products or more generally with particular types of items, to particular types of user interfaces or other mechanisms for interacting with users or otherwise using selected content items, etc. For example, in some embodiments, the described techniques may be used to select entities (e.g., people, businesses or other organizations, etc.) or other things distinct from content items and products, may be used to select content items to be provided to entities other than users (e.g., organizations or other groups), etc.

FIGS. 2A and 2B illustrate examples of selecting content items based at least in part on search results. In particular, FIG. 2A illustrates an example of a Web page (or HTML-based email information page) 200a that is provided by an example online retailer RRR, such as for display to a particular user (not shown). In this example, the Web page 200a includes example search results 205 displayed as a result of a consumer user entering one or more example search terms XYZ 204. In the example provided, the search results 205 include multiple items or products, such as by individually identifying those multiple items or products (e.g., in a list, as part of a comparison, etc.), although in other situations information may be provided about an item category or other grouping of multiple items that are part of the indicated category or other group. The Web page 200a may also optionally include various user-selectable item ordering controls 210 with which the user may interact to initiate the purchase or other acquisition of one or more of the multiple items indicated in the search results 205 from the online retailer RRR, such as if particular ordering controls 210 are associated with particular products listed in the search results 205. The displayed search results 205 may be interactive, such that the user may select links or other user-selectable controls provided as part of or within the search results 205 to obtain more information regarding the products or services indicated in the search results 205, or to otherwise initiate one or more other actions with respect to those products or services. The Web page 200a may also include other user selectable controls (not shown) enabling the user to obtain or to display other information regarding products or services indicated in the search results 205 (e.g., information about one or more product categories that the user may select and browse).

In this example, the Web page 200a also includes sections 215a and 225a that have information about various product recommendations based at least in part on the search results 205, such as for potential selection and purchase by the user. In particular, an example embodiment of the CIS service (not shown) uses at least some of the described content item selection techniques to select particular content items for display based on a determined product category corresponding to the search results 205. For example, the product recommendations section 215a in this example corresponds to one or more other items that are in such a category determined based on the search results 205, and includes two content items 216a and 217a that are advertisements for two such other items (e.g., particular products available from the online retailer RRR). In addition, the product recommendations section 225a in this example corresponds to top-selling items in the same product category determined based on the search results 205, and includes two content items 226a and 227a that are advertisements for two such items.

As explained in more detail elsewhere herein, the category or categories determined for the search results 205 may be based on various factors, including, but not limited to, one or more of the following: categories of products indicated in the search results 205, a quantity of products indicated in the search results 205 within a particular category, a quantity of products indicated in the search results 205 within a particular category relative to quantities of other products indicated in the search results 205 of other categories, etc. In addition, in some embodiments, product recommendations for various subsets of products in the same product category determined based on the search results 205 (and/or other products in other categories determined based on the search results 205) may be displayed in various other combinations and various other sections (not shown) of the web page 200a, or may be otherwise electronically communicated or made available to the user. As one example, section 215a may include recommendations for products that correspond to a first product category determined based on the search results 205 (with that first product category optionally identified in the associated section designation 220a), and section 225a may include recommendations for products that correspond to a distinct second product category determined based on the search results 205 (with that second product category optionally identified in the associated section designation 220b). Also, the designation 220a that the product recommendations in section 215a are based on the search results 205 is for illustrative purposes and may be omitted in other embodiments, or may instead state, for example, "You May Also Be Interested in the Following," or otherwise include different statements or designations regarding the product recommendations. Likewise, the designation 220b that the product recommendations in section 225a are top selling items in the category determined from the search results 205 is also for illustrative purposes and may be omitted in other embodiments, or may instead state, for example, "Top Selling Items," or otherwise include different statements or designations regarding the product recommendations.

In this example, the product recommendations sections 215a and 225a include recommendations for products distinct from those products indicated in the search results 205, such as to provide the user with additional options and opportunities in which the user may be interested that did not appear in the search results 205, although in other embodiments some overlap may occur between products indicated in sections 215a and/or 225a with respect to each other and/or with respect to the search results 205. Furthermore, in some embodiments only one of sections 215a and 225a may be displayed. The product recommendations from sections 215a and/or 225a may be obtained in various manners in various embodiments, as discussed in greater detail elsewhere. In addition, while example content items 217a and 226a are for the same product item in this example, to illustrate that a particular content item or its associated product item may be a top selection within the general category determined based on the search results 205, in other embodiments one or more particular content items for a particular product/service item may be used only a single time on such a Web page.

FIG. 2B illustrates an alternative Web page 200b that is similar to that of Web page 200a of FIG. 2A, but in which an example embodiment of the CIS service (not shown) uses at least some of the described content item selection techniques to select particular content items for display based on a determined category associated with the search terms XYZ 204, such as based on prior user actions of other users after prior searches that have similar or identical search terms, although in other embodiments the determined category of the search terms XYZ 204 may be based at least in part on one or more determined categories of the search results 205. As explained in more detail elsewhere herein, the category or categories of the search terms XYZ 204 may be determined based on various factors, including, but not limited to, one or more of the following: tracked user actions related to the products in the search results 205, stored metadata related to products indicated in the search results, frequency of products of particular categories appearing in various searches over time using the same or similar search terms, etc.

In this example, the Web page 200b includes sections 215b and 225b that have information about various product recommendations based at least in part on the search terms XYZ 204, such as for potential selection and purchase by the user. For example, the product recommendations section 215b in this example corresponds to one or more other items that are in a category determined based on the search terms XYZ 204 and includes two content items 218a and 219a that are advertisements for two such other items. In addition, the product recommendations section 225b in this example corresponds to top-selling items in the same product category determined based on the search terms XYZ 204 and includes two content items 228a and 229a that are advertisements for two such items. As noted with respect to FIG. 2A, in other embodiments various differences may occur with respect to the recommended content items, including to display only one of sections 215b and 225b, to use multiple associated product categories, to group item recommendations in other manners, to use different types of section designations 220c and 220d, to include or not include overlap in products of some or all of sections 215b and 225b and 205, etc. In addition, product recommendations from sections 215b and/or 225b may be obtained in various manners in various embodiments.

It will be appreciated that various of the details illustrated in FIGS. 2A and 2B are included for explanatory purposes, and that the inventive described techniques may be used in other manners and without the exemplary details.

Figure 3:
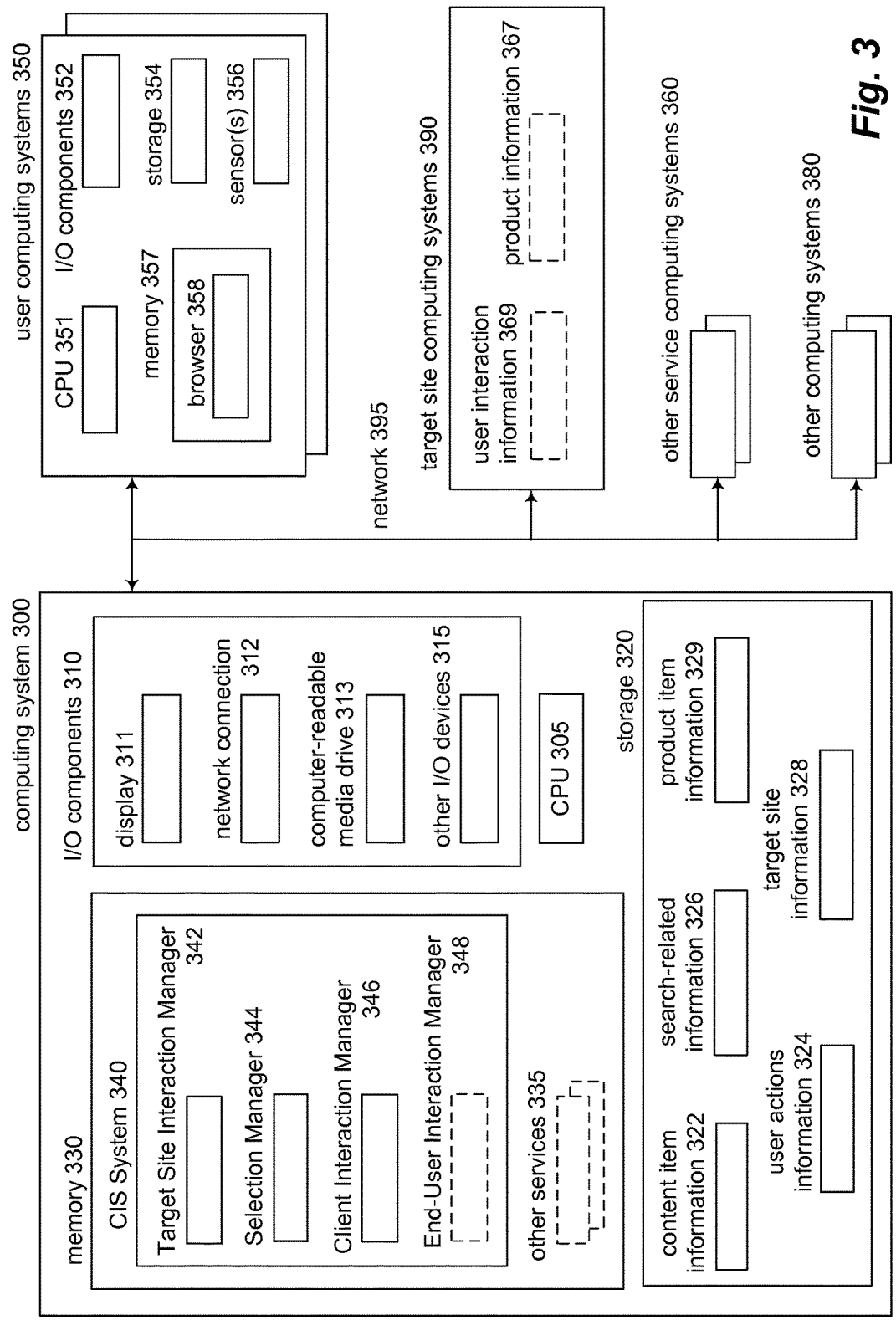
FIG. 3 is a block diagram illustrating example computing systems suitable for executing a content item selection system for selecting content items based on search results.

FIG. 3 is a block diagram illustrating example computing systems suitable for executing a content item selection system for selecting content items based on search results. In particular, FIG. 3 illustrates a server computing system 300 suitable for executing an embodiment of a Content Item Selection ("CIS") system 340, as well as various user computing systems or devices 350, target site computing systems 390, other optional computing systems 360 that optionally provide other services with which the CIS system interacts, and other optional computing systems 380. In the illustrated embodiment, the server computing system 300 has components that include one or more CPU processors 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, 1/O components 352 (although particular components are not illustrated), storage 354, and memory 357. The user computing systems may also optionally include one or more sensors 356, such as may be used to provide information about geographical location, position, acceleration, orientation, ambient lighting, temperature, sounds, images, video, and other environmental and system factors. The other computing systems 360, 380 and 390 may also each include similar components to some or all of the components illustrated with respect to computing systems 300 and 350, but such components are not illustrated in this example for the sake of brevity.

An embodiment of the CIS system 340 is executing in memory 330, such as under control of CPU 305 as programmed or otherwise configured by executable software instructions of the system 340, and the system 340 may interact with computing systems 350, 360, 380 and/or 390 over the network 395 (e.g., via the Internet and/or the World Wide Web, via a private cellular network, etc.). In this example embodiment, the CIS system 340 includes functionality related to selecting particular content items for presentation in particular situations to users (not shown) who are interacting with user computing systems 350, such as in conjunction with a CIS service provided by or otherwise managed by the CIS system 340. The information from the CIS system may in some embodiments and situations be provided directly to the user computing systems 350, while in other embodiments the information may be provided indirectly by the CIS system via one or more target sites provided by the computing systems 390 to the users and/or via other services (e.g., optional other services 335, optional other services provided by the other service computing systems 360, etc.) that interact directly with the users, such as if the users are customers of the services.

The other computing systems 350, 360, 380 and 390 may have various forms, and may be executing various software as part of interactions with the CIS system. For example, user computing systems 350 may include various types of client devices (e.g., a desktop computing system, a laptop or tablet or other portable computing system, a smartphone or other cell phone or other mobile device that includes appropriate communication and computing capabilities, etc.), and in the illustrated embodiment is shown executing a Web browser 358 or other software in memory 357 to interact with other computing systems (e.g., the target site computing systems) and/or the CIS system 340 (e.g., if the software 358 is a module of the CIS system that is designed to execute on a client device). The Web browser 358 or other software on a user computing system 350 may, for example, obtain and display Web pages or other information from target site computing systems 390, such as on one or more display devices that are part of the I/O components 352. In addition, the display of that information may initiate one or more requests by the Web browser 358 to the CIS system 340 to obtain information about content items selected by a Selection Manager module 344 of the system 340, such as may be triggered by corresponding instructions or information included in the obtained Web pages or other information being displayed. These requests may include information from sensors 354 present on the device, which may be used by the CIS system 340 to enhance selection of content items. The Web browser 358 or other software on the user computing system may display or otherwise present some or all of the information obtained in response to those requests (e.g., via a GUI of the CIS system that is displayed to the user via one or more Web pages or other UI screens on the user computing system 350) to enable the user to interact with or otherwise use that information in various manners (e.g., to obtain additional information about associated product/service items, to initiate purchases or other acquisitions of such associated product/service items, etc.). While not illustrated, software executing on one or more of the target site computing systems 390 may similarly interact with the CIS system 340 (e.g., with a Target Site Interaction Manager module 342 of the system 340) to obtain information about content items selected by the Selection Manager module 344 of the system 340, and may include some or all of that obtained information as part of Web pages provided to users for display, whether instead of or in addition to interactions by the user computing systems 350 with the CIS system 340 (e.g., with an optional End User Interaction Manager module 348 of the CIS system 340). In addition, one or more users of the user computing systems 350 may in some embodiments interact with CIS system 340 to perform various other types of actions, such as to interact with a Client Interaction Manager module 346 of the system 340 to define and monitor content item visibility campaigns of clients.

In addition, as described in greater detail elsewhere, the CIS system 340 may in some embodiments be integrated with or otherwise affiliated with one or more other services (e.g., online retailers or other retailers, item review services, databases or other services that provide information about items and/or about user actions with items, etc.), and if so may interact with those other services in various manners. If so, one or more such other services may, for example, execute on computing system 300 as other services 335 in memory 330, as one or more other services (not shown) that each execute on one or more of the target site computing systems 390, and/or as one or more services (not shown) that each execute on one or more of the other remote service computing systems 360. The interactions with the other services may include, for example, some or all of the following non-exclusive list: obtaining information about online search results and/or related search terms used in the online searches performed on Web pages of target sites, such as corresponding to optional user interaction information 369 on target site computing system 390; obtaining information about products and other items indicated in the search results or other information to which the service has access, such as product information 367 on target site computing system 390 and/or similar product information (not shown) on other service computing system 360 to include in the product item and/or category metadata database 329 in storage 320; obtaining information about various types of prior interactions of customers and other users with the other services or otherwise about which the other services have access to information, such as related to products indicated in online search results (e.g., to view information about items; to purchase items; to provide other types of feedback about particular items or relationships between items, such as that a particular item is regarded in a particular positive or negative manner, or that two or more items are similar to each other or are otherwise related in one or more manners; etc.), and optionally corresponding to optional user interaction information 369 on target site computing system 390 and/or similar user interaction information (not shown) on other service computing system 360; etc. The CIS system may obtain such information in various manners, such as by the CIS system pulling such information from one or more other services periodically and/or on demand, by one or more other services pushing such information to the CIS system periodically and/or as otherwise triggered (e.g., as soon as the information is available, such as to maintain a live feed so that the CIS system has access to the most up-to-date available information), etc.

After such information is obtained by the CIS system, the CIS system may then store such information for later use. For example, the information about online search results and/or related search terms used in the online searches may be stored in database data structure 326 on storage 320, as well as information about stored mappings between search terms and associated product categories. The information about various types of prior actions of customer users may be stored in database data structure 324 on storage 320. The information about products and other items available (e.g., obtained from product information 367) may be stored in database data structure 329. The CIS system may alternatively store some or all such information or on one or more remote other computing systems 380, or in other embodiments may instead retrieve the information as needed and not maintain a local copy of the information. Various other information related to the operation of the CIS system 340 may also be stored in storage 320 or elsewhere (e.g., information 322 about particular content items that are available for display, such as in conjunction with product/service items associated with the content items; information 328 about target sites for which the CIS system selects content items; information about other clients of the CIS system, such as preference information; information about particular end users who display content items selected by the CIS system, including user preference information and/or user-specific prior interaction information; information about particular client devices of end users that display content items selected by the CIS system, including information from sensors 356, information about sensors 356 that relate to capabilities to display or otherwise present selected content items, and/or other information about capabilities of the client device to display or otherwise present selected content items; etc.).

The CIS system 340 may use the various available information in various manners, including to select content items for particular situations. For example, the Selection Manager system 344 may select product-related content items based on consumer user search results for display to consumer users. In some embodiments, the content items are displayed on the same electronic information page (e.g., Web page) as the search results, and may be related to or associated with additional products or services distinct from those indicated in the search results. The CIS system 340 may select the content items in various manners, as discussed in greater detail elsewhere. The information content item selection information provided by the CIS system 340 may in some embodiments and situations be dynamically generated by the CIS system 340 in response to a request, while in other embodiments and situations may be dynamically retrieved by the CIS system 340 from previously determined and stored information.

While not illustrated here, the CIS system may further have other modules or associated functionality in other embodiments, such as to generate some or all of the user actions information 324 (e.g., based on monitoring users' interactions with retailers or other services; based on retrieving and processing information from retailers or other services related to such interactions, such as to identify data to be used with particular content item selection strategies; etc.). Additional details related to various operations of embodiments of the CIS system and an associated CIS service are included elsewhere.

It will be appreciated that computing systems 300, 350, 360, 380 and 390 are merely illustrative and are not intended to limit the scope of the present invention. The computing systems/devices may instead each include multiple interacting computing systems or devices, and the computing systems/devices may be connected to other devices that are not illustrated, including through one or more networks such as the Internet, via the Web, or via private networks (e.g., mobile communication networks, etc.). More generally, a computing device or other computing system may comprise any combination of hardware that may interact and perform the described types of functionality, optionally when programmed or otherwise configured with appropriate software, including without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CIS system 340 may in some embodiments be distributed in additional modules or combined in fewer modules. Similarly, in some embodiments some of the functionality of the CIS system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
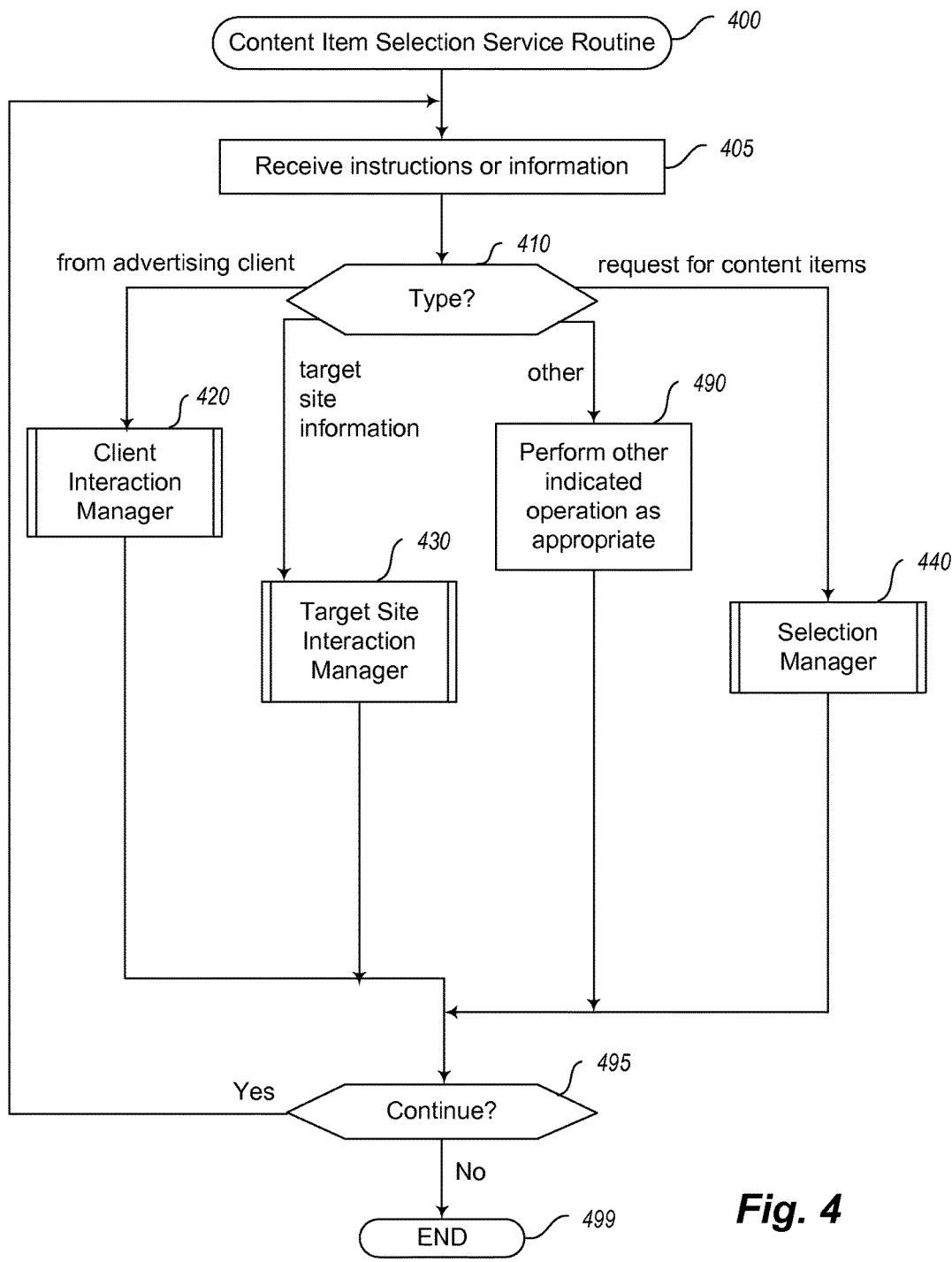
FIG. 4 is a flow diagram of an example embodiment of a Content Item Selection Service routine.

FIG. 4 is a flow diagram of an example embodiment of a Content Item Selection Service routine 400. The routine may be provided by, for example, execution of an embodiment of the Content Item Selection Service 105 of FIG. 1 and/or of the content item selection service provided by the Content Item Selection system 340 of FIG. 3, such as to dynamically select promotional content items for display to users in particular situations. The illustrated operations are performed in an automated manner by one or more programmed computing systems in the illustrated embodiment.

The illustrated embodiment of the routine 400 begins at block 405, where instructions or information is received. The routine then continues to block 410 to determine the type of information or instructions, and to proceed accordingly. In particular, if it is determined in block 410 that the information or instructions received in block 405 are from an advertising client, such as with respect to new content for display or to use in conjunction with advertising, the routine continues to block 420 to execute an embodiment of a Client Interaction Manager routine, with one example of such a routine being further illustrated with respect to FIG. 5. If it is instead determined in block 410 that the information or instructions received in block 405 are from a target site, such as with respect to displaying selected items on Web pages or other information pages supplied by that target site, the routine continues to block 430 to execute an embodiment of a Target Site Interaction Manager routine, with one example of such a routine being further illustrated with respect to FIG. 6. If it is instead determined in block 410 that the information or instructions received in block 405 are a request to provide information about one or more selected content items, such as from a target site for a particular user and a particular Web page or other information page supplied by that target site, or such as from a user to whom the selected content items are to be displayed, the routine continues to block 440 to execute an embodiment of a Selection Manager routine, with one example of such a routine being further illustrated with respect to FIGS. 7A and 7B.

If it is instead determined in block 410 that the information or instructions received in block 405 are not from an advertising client or a target site and are not a request for selected content items, the routine continues instead to block 490 to perform one or more other indicated operations as appropriate. Such other operations may have various forms in various embodiments, with a non-exclusive list of such operations including the following: receiving individual or aggregate information about prior user interactions with one or more target sites, and storing the information for later use in content item selection; receiving information about prior actions and interactions of one or more users with one or more target sites (e.g., those actions related to products indicated in search results), and storing the information for later use in content item selection for that user; analyzing received information about prior user actions to determine product categories associated with particular search terms; receiving information about capabilities of a client device of a particular user, and storing the information for later use in content item selection for that user, and storing the information for later use in content item selection and display; etc.

After blocks 420, 430, 440 or 490, the routine continues to block 495 to determine whether to continue, such as until an explicit instruction to terminate is received. If it is determined to continue, the routine returns to block 405, and otherwise continues to block 499 and ends.

Figure 5:
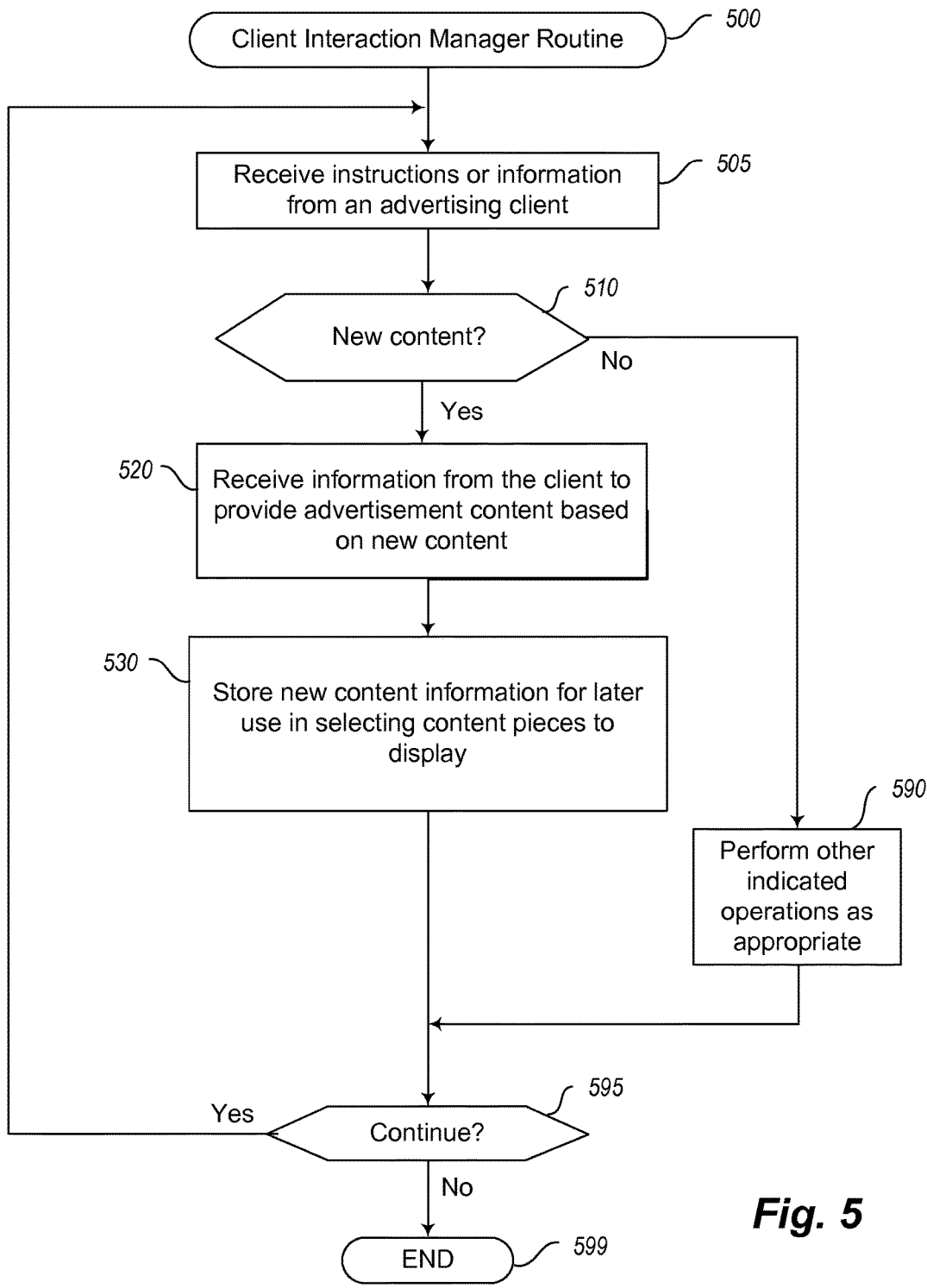
FIG. 5 is a flow diagram of an example embodiment of a Client Interaction Manager routine.

FIG. 5 is a flow diagram of an example embodiment of a Client Interaction Manager routine 500. The routine may be provided by, for example, execution of an embodiment of the Client Interaction Manager module 346 of the CIS system 340 of FIG. 3 and/or of a portion of the Content Item Selection Service 105 of FIG. 1, such as to facilitate the definition and use of various content in providing advertisement content based on search results performed by consumer users as part of Web pages provided to the users that include the search results. The routine may be invoked in various manners in various embodiments, including with respect to block 420 of FIG. 4. The illustrated operations are performed in an automated manner by one or more programmed computing systems in the illustrated embodiment.

The illustrated embodiment of the routine 500 begins at block 505, where instructions or information is received from an advertising client. The routine then continues to block 510 to determine if the instructions or information correspond to a new content item, such as that to be displayed to users in connection with content items selected based on user search results. If so, the routine continues to block 520 to receive information corresponding to the new content item, and in block 530 stores the new content item and associated information for later use in selecting content items to display. It will be appreciated that new content information may include information about particular products to which the content item corresponds, particular target sites (or particular Web pages or other information pages from particular target sites) on which to display the content item, information about a campaign or other contractual arrangement via which the content item selection service selects content items for the advertising client (e.g., in exchange for defined fees paid by the advertising client, including in some cases to obtain payment and/or payment information in advance), etc. In addition, as discussed in greater detail elsewhere, the interactions with the advertising client may occur in various manners in various embodiments, including based on interactions of a user representative of the client with a GUI provided by the CIS service, or instead in other manners.

If it is instead determined in block 510 that the information or instructions received in block 505 are not related to new content, such as that to be displayed to users in connection with content items selected based on user search results, the routine continues instead to block 590 to perform one or more other indicated operations as appropriate. Such other operations may have various forms in various embodiments, including receiving and responding to instructions from a client to modify selection of content items in a particular manner.

After blocks 530 or 590, the routine continues to block 595 to determine whether to continue, such as until an explicit instruction to terminate is received. If it is determined to continue, the routine returns to block 505, and otherwise continues to block 599 and ends. In addition, as part of block 595, the routine may further provide a return indication to a routine from which it was invoked (e.g., routine 400 of FIG. 4).

Figure 6:
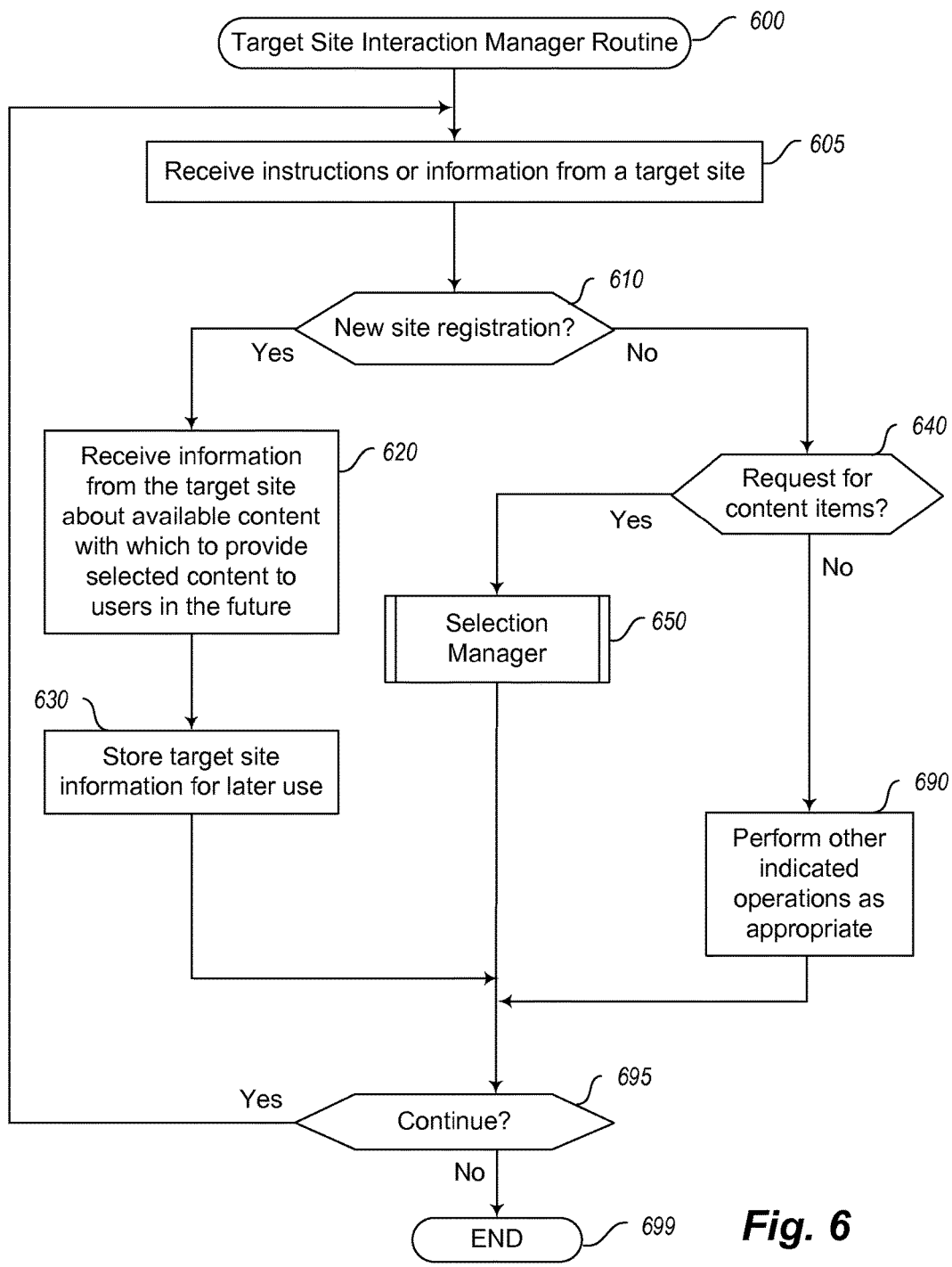
FIG. 6 is a flow diagram of an example embodiment of a Target Site Interaction Manager routine.

FIG. 6 is a flow diagram of an example embodiment of a Target Site Interaction Manager routine 600. The routine may be provided by, for example, execution of an embodiment of the Target Site Interaction Manager module 342 of the CIS system 340 of FIG. 3 and/or of a portion of the Content Item Selection Service 105 of FIG. 1, such as to facilitate the use of selected content items with particular Web pages and/or other information pages of particular target sites. The routine may be invoked in various manners in various embodiments, including with respect to block 430 of FIG. 4. The illustrated operations are performed in an automated manner by one or more programmed computing systems in the illustrated embodiment.

The illustrated embodiment of the routine 600 begins at block 605, where instructions or information is received for a target site, such as from a user representative of the target site, or from software executing on the target site. The routine then continues to block 610 to determine if the instructions or information correspond to a registration of a new target site for which content items may be selected and displayed. If so, the routine continues to block 620 to receive information about the target site, and in block 630 stores the target site information for later use in selecting content items to display. It will be appreciated that obtaining the information about a target site may include a variety of types of interactions over time, and the receipt of a variety of types of information. As discussed in greater detail elsewhere, the target site-related information may include information about particular Web pages and/or other information pages provided by the target site to end users (e.g., product or item search pages, product information pages, etc.), information about product items and/or other items that are the subject of at least some of the Web pages (including various metadata about particular product items, including associated product categories), previous search results, and/or other information pages, information about particular content items and/or associated product/service items that may be provided for at least some of the Web pages and/or other information pages, information about one or more portions of information pages that are available for content item display (such as a blank area of the page, an area designated to hold one or more content items, etc.), information about prior individual or aggregate user interactions with Web pages and/or other information pages provided by the target site, information about prior interactions of particular users with the target site (e.g., interaction regarding user actions related to the products indicated in search results), information about a contractual arrangement via which the content item selection service will provide selected content items for the target site (e.g., in exchange for defined fees paid by the target site and/or paid to the target site by the content item selection service, including in some cases to obtain payment and/or payment information in advance from the target site), etc. In addition, as discussed in greater detail elsewhere, the interactions with the target site may occur in various manners in various embodiments, including based on interactions of a user representative of the target site with a GUI provided by the CIS service, or instead in other manners.

If it is instead determined in block 610 that the information or instructions received in block 605 are not related to registering a new target site, the routine continues instead to block 640 to determine if a request is received from a target site for one or more selected content items, such as on behalf of an end user of the target site that will receive one or more Web pages or other information pages from the target site. If so, the routine continues to block 650 to execute an embodiment of a Selection Manager routine, with one example of such a routine being further illustrated with respect to FIGS. 7A and 7B.

If it is instead determined in block 640 that the information or instructions received in block 605 are not a request for one or more selected content items, the routine continues instead to block 690 to perform one or more other indicated operations as appropriate. Such other operations may have various forms in various embodiments, with a non-exclusive list of such operations including the following: receiving and responding to instructions from a target site to modify a previous registration, including to optionally suspend or terminate the relationship between the target site and the content item selection service; receiving and responding to a request from a target site regarding the performance of interactions between the target site and the content item selection service, such as to enable monitoring of ongoing selection and provision of content items for the target site; receiving and storing aggregate information about prior or current user interactions with the target site and any other related user actions; receiving and storing information about prior or current interactions of a particular user with the target site and any other related user actions; etc.

After blocks 630, 650 or 690, the routine continues to block 695 to determine whether to continue, such as until an explicit instruction to terminate is received. If it is determined to continue, the routine returns to block 605, and otherwise continues to block 699 and ends. In addition, as part of block 695, the routine may further provide a return indication to a routine from which it was invoked (e.g., routine 400 of FIG. 4).

Figure 7A:
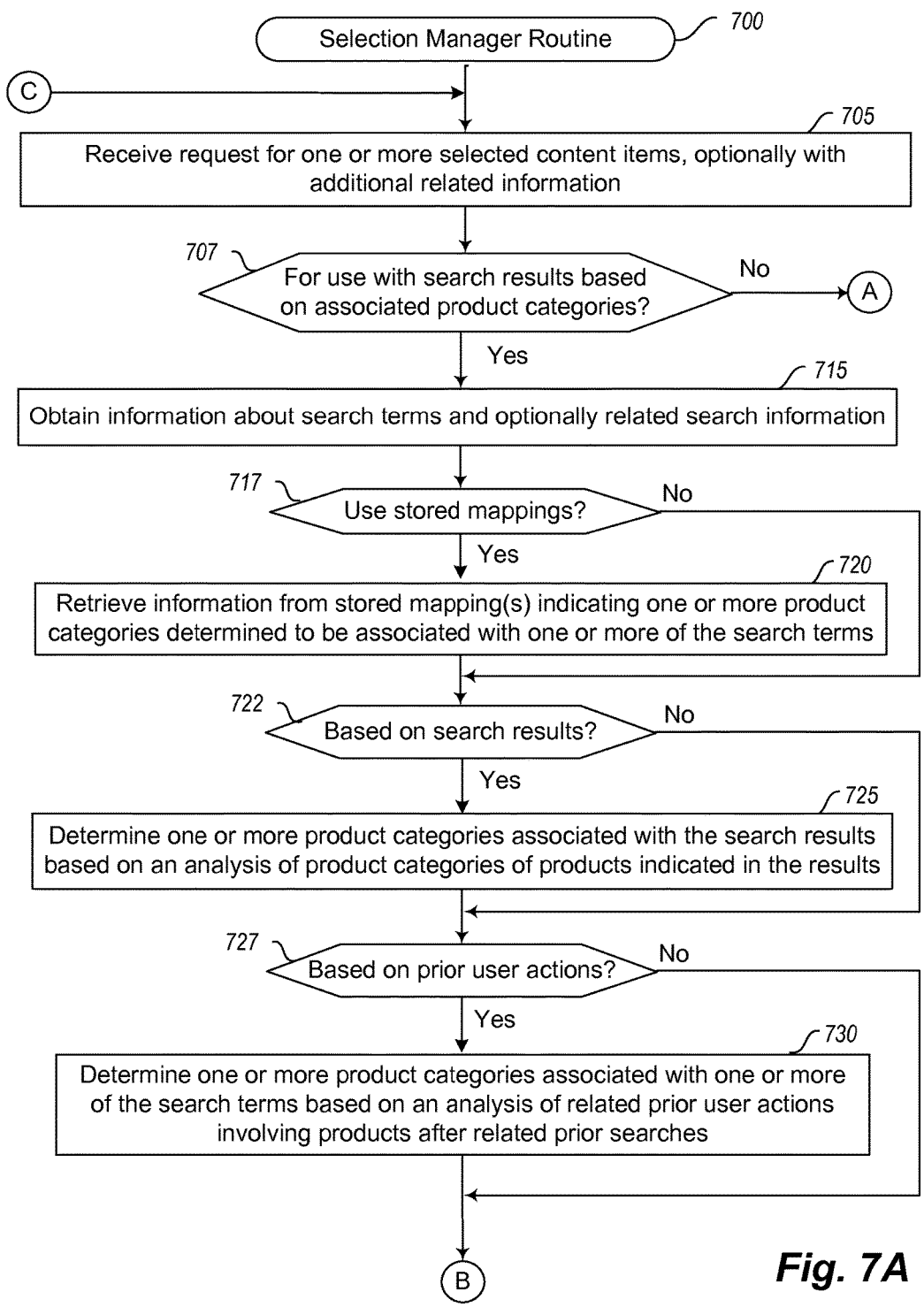
FIGS. 7A and 7B are a flow diagram of an example embodiment of a Selection Manager routine.
Figure 7B:
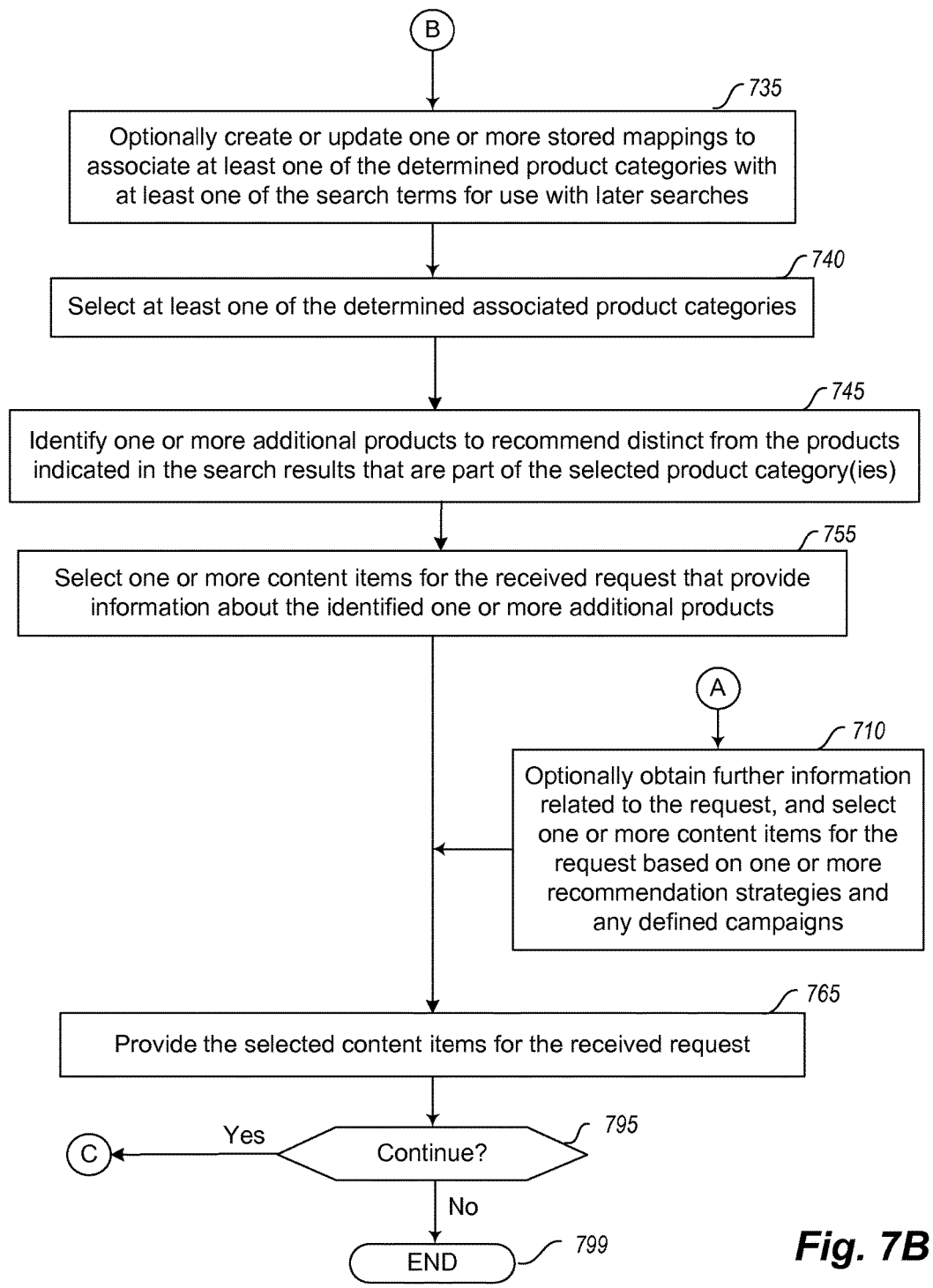

FIGS. 7A and 7B are a flow diagram of an example embodiment of a Selection Manager routine 700. The routine may be provided by, for example, execution of an embodiment of the Selection Manager module 344 of the CIS system 340 of FIG. 3 and/or of a portion of the Content Item Selection Service 105 of FIG. 1, such as to facilitate the selection and provision of particular content items for display with particular Web pages and/or other information pages of target sites. The routine may be invoked in various manners in various embodiments, including with respect to block 440 of FIG. 4 and/or block 650 of FIG. 6. The illustrated operations are performed in an automated manner by one or more programmed computing systems in the illustrated embodiment.

The illustrated embodiment of the routine 700 begins at block 705, where a request is received for one or more selected content items, such as from a target site for one or more Web pages or other information pages of that target site, or from an end user to whom the selected content items are to be displayed. As discussed in greater detail elsewhere, in at least some embodiments and situations, the request will include information about one or more of the following: one or more particular target site pages (e.g., one or more portions of a particular page that are available for display of the selected content items, such as particular locations on a search results page to accompany other search results on that page), information about a search to which the display of the selected content items will correspond (e.g., about one or more search terms of the search), information about search results with which the display of the selected content items will correspond (e.g., about product-related links or information that will be included in the search results), one or more products indicated within search results with which the display of the selected content items will correspond, one or more indicated products otherwise associated with a target page on which the selected content items will be displayed (e.g., a particular product, a product category that includes multiple indicated products of a common type, etc.), a particular end user to whom the selected content items will be displayed (e.g., an identity of the end user, information about prior or current actions of the end user regarding products indicated in search results, etc.), information about prior or current actions of other users regarding products after similar or identical searches, and a particular client device of an end user (e.g., particular capabilities of the client device for displaying information, a particular location, etc.).

After block 705, the routine continues to block 707 to determine whether the request is to provide content items to accompany (or otherwise be associated with) search results from a user search based on one or more product categories determined to be associated with the search. If so, the routine continues to block 715, and otherwise continues to block 710. In block 710, the routine optionally obtains additional information related to the request, and selects one or more content items for the request based on one or more recommendation strategies in combination with any such additional information and/or any defined advertising campaigns. Such additional information may include one or more of the following non-exclusive list: one or more particular target site pages on which the selected content items will be displayed, a particular end user to which the selected content items will be displayed, and a particular client device of an end user on which the selected content items will be displayed. The obtaining of the information in block 710 may include various types of actions in various embodiments and situations, including receiving information in block 705, retrieving information from storage, performing dynamic automated interactions with a target site to retrieve information (e.g., information about particular target site pages, associated indicated products, and/or an associated user), performing dynamic automated interactions with the end user's client device to retrieve information about capabilities of the device, etc. After block 710, the routine continues to block 765.

If it is instead determined in block 707 that the request is to provide content items to accompany (or otherwise be associated with) search results from a user search based on one or more product categories determined to be associated with the search, the routine continues to block 715 to obtain information about the search terms for the search, as well as to optionally obtain additional related information (e.g., information about any stored mappings of product categories to the search terms, about the search results for the search, about products indicated in the search results, about other products and associated product categories, about user actions including online activity information for other prior searches that are related to the current search, etc.). The routine may obtain such information in various manners, such as by pulling such information from one or more other services periodically and/or on demand, by one or more other services pushing such information periodically and/or as otherwise triggered (e.g., as soon as the information is available, such as to maintain a live feed so that the routine has access to the most up-to-date available information), etc. In addition, some or all such information may be received in block 705 and retrieved in block 715.

After block 715, the routine determines one or more product categories associated with the current search in blocks 717-730, and then subsequently uses those determined product categories to select one or more content items for use with the search—however, as discussed in greater detail elsewhere, in other embodiments the routine may perform similar actions to select content items for use with the search but without using product categories. In particular, in the illustrated embodiment, the routine first continues to block 717 to determine whether stored mappings are available for one or more of the search terms currently used to one or more product categories that were previously determined to be associated with those search terms, and if so whether to use such stored mappings for the current request (e.g., based on the request, on current settings for the routine, etc.). If so, the routine continues to block 720 to retrieve information about one or more stored mappings that correspond to the current search terms, and to identify one or more product categories determined to be associated with one or more of the current search terms from the stored mappings.

After block 720, or if it was instead determined in block 717 not to use stored mapping information, the routine continues to block 722 to determine whether to use product categories that are determined based on the search results. If so, the routine continues to block 725 and determines one or more product categories associated with the search results. The routine may select a product category for the search results based on various factors, including, but not limited to, information about products indicated in the search results (e.g., based on categories of products indicated in the search results, a quantity of products indicated in the search results within a particular category, a quantity of products indicated in the search results within a particular category relative to quantities of other products indicated in the search results 205 of other categories, etc.), optionally including stored metadata related to those products.

After block 725, or if it was instead determined in block 722 not to use the search results to determine associated product categories, the routine continues to block 727 to determine whether to use product categories that are determined based on prior user actions with respect to prior searches that are related to the current search (e.g., that include similar or identical search terms). If so, the routine continues to block 730 and determines one or more product categories associated with one or more of the current search terms based on the prior user actions. The routine may select a product category for one or more search terms based on various factors, including, but not limited to, one or more of the following: tracked user actions related to the products in search results for related prior searches, frequency of products of particular categories appearing in various searches over time using the same or similar search terms, stored metadata related to products that users previously interacted with after such prior searches, etc. For example, in some embodiments, the tracked information may be used to categorize the search terms used in searches, or search results of the searches, when such tracked information is related to products indicated in the search results of those searches.

After block 730, or if it was instead determined in block 727 not to use information about prior user actions to determine associated product categories, the routine continues to blocks 735-755 to select one or more content items for the current request based on the one or more product categories determined in blocks 720, 725 and/or 730. It will be appreciated that only a subset of the types of determinations of blocks 720, 725 and/or 730 may be used in some embodiments, and/or that particular combinations of the types of determinations of blocks 720, 725 and/or 730 may be used in some embodiments (e.g., to always perform at least one of the types of determinations, to not perform the determinations of blocks 725 and/or 730 if the determination of block 720 is performed, etc.). In the illustrated embodiment, the routine in block 735 optionally creates or updates one or more stored mappings based on one or more product categories determined in blocks 725 and/or 730 (if applicable), so as to associate one or more of the current search terms with one or more of those determined product categories, although in some embodiments such stored mappings may not be used. After block 735, the routine continues to block 740 to select at least one of the determined product categories for the current search, such as to select all of the determined product categories, one or more product categories with a highest assessed degree of relevance for the current search (e.g., a most frequent product category associated with products in the search results, a most frequent product category associated with prior user actions, etc.), a product category that is identified by each of multiple types of determinations, etc.

After block 740, the routine continues to block 745 to identify one or more additional products to recommend to the user based on the selected product category(ies), with those additional products being distinct from the products indicated in the search results in the illustrated embodiment. After block 745, the routine continues to block 755 to select one or more content items to provide for the received request that provide information about the one or more identified additional products. It will be appreciated that there may exist multiple different content items from which to select including information about a given product, and that one or more of such multiple content items may be selected in various manners. In addition, in at least some embodiments, the selection further includes using one or more targeted recommendation strategies to select particular candidate content items, such as based at least in part on indicated target site pages, and optionally in a manner that is independent of the associated end user and/or client device. If so, the selected candidate content items may optionally be adjusted or otherwise influenced based in part on information about the associated end user (e.g., recent interactions of the end user) and/or client device (e.g., current device location, current display capabilities, etc.). Alternatively, the one or more targeted recommendation strategies may in some embodiments perform the selection of the candidate content items based in part on information about the associated end user and/or client device, with those candidate content items being selected for use without further adjustment.

After blocks 735 or 710, the routine continues to block 765 to provide the selected content items for the received request to the requester, such as via one or more sent electronic communications (e.g., based on use of the HTTP protocol over TCP/IP, based on sending one or more email communications, etc.). As previously discussed, in some embodiments and situations, a target site may configure a particular target site page to include search results or information about a search in a first portion of the page, and also include one or more locations in one or more other portions of the page that are intended to include one or more selected content items and/or other selected additional information from the content item selection service. The configured target site page may optionally be distributed to a client device of an end user, and when the client device initiates display of the configured target site page, the configured target site page may include links (e.g., HTML <img> elements, or similar functionality) that initiate interactions between the client device and the content item selection service to obtain particular content item pieces to display in particular locations of the target site page, with the electronic communications being sent as part of the interactions. In such situations, the request received in block 705 may be from such a client device, and the information provided in block 765 may be to such a client device.

After block 765, the routine continues to block 795 to determine whether to continue, such as until an explicit instruction to terminate is received. If it is determined to continue, the routine returns to block 705, and otherwise continues to block 799 and ends. In addition, as part of block 795, the routine may further provide a return indication to a routine from which it was invoked (e.g., routine 400 of FIG. 4 or routine 600 of FIG. 6).

While not illustrated in this embodiment, in other embodiments routine 700 or a similar routine may perform additional operations at times, including upon request. For example, such a routine may receive information about user actions performed after various searches, and perform an analysis of such information at one or more times other than during content item requests in order to determine product categories related to particular search terms, so that corresponding mappings may be stored for later use.

Figure 8:
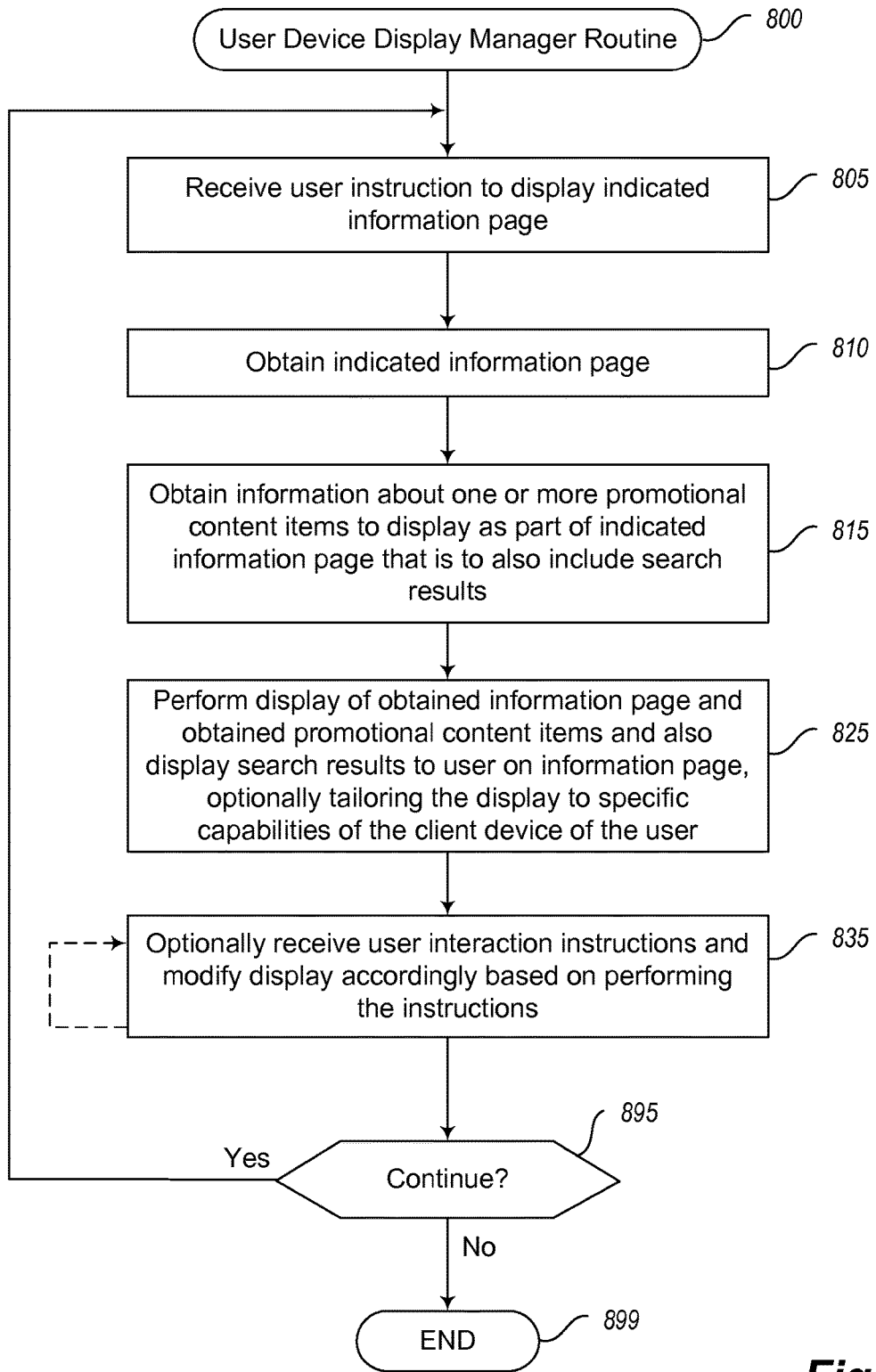
FIG. 8 is a flow diagram of an example embodiment of a User Device Display Manager routine.

FIG. 8 is a flow diagram of an example embodiment of User Device Display Manager routine 800. The routine may be provided by, for example, execution of software (e.g., browser 358) of user computing system 350 of FIG. 3 and/or of software executing on client devices (not shown) of users 140 of FIG. 1, such as to facilitate the display to end users of selected content items as part of Web pages and/or other information pages of target sites, and to optionally enable additional types of end user interactions with displayed selected content items.

The illustrated embodiment of the routine 800 begins at block 805, where a user instruction is received to display an indicated information page of a target site. Such an instruction may include, for example, clicking on a link to a target site Web page, opening an HTML-based target site email information page, entering search terms within a Web page that includes searching capabilities, etc. In other embodiments, the display of a particular target site information page may be initiated in other manners than an explicit user instruction.

In block 810, the routine then performs operations to obtain the indicated information page, such as to request and receive a particular target site Web page by interacting with remote Web site server software for that target site, to retrieve (e.g., from local storage) a particular target site online search results information page that was previously received and stored, to request and receive a particular target site online search results information page by interacting with remote server software for that target site, etc. When interacting with one or more remote computer systems to obtain the indicated information page, the routine may further optionally provide various information about the client device executing the routine and/or about an end user who is using the client device, as discussed in greater detail elsewhere.

After block 810, the routine continues to block 815 to obtain information about one or more promotional content items that are selected for display as part of the indicated target site information page, with those selected content item(s) optionally to be displayed in a particular manner or determined format within the indicated target site information page in at least some embodiments and situations. The obtaining of the information about the one or more promotional content items may be performed in various manners, including in some cases as part of the operations in block 810 of obtaining the indicated information page, and further may in some situations include performing interactions with a remote content item selection service to request and receive the selected content item(s). For example, as previously discussed, when the client device initiates display of a received configured target site information page, the configured information page may include links (e.g., HTML <img> elements, or similar functionality) that initiate interactions between the client device and the content item selection service to obtain particular content item pieces to display in particular locations of the target site page.

In block 825, the routine then performs the display of the obtained target site information page and obtained promotional content items to an end user, and may further in some embodiments and situations tailor the display to use specific capabilities of the client device (or to not use capabilities that are not available on the client device). It will be appreciated that references to displaying an information page and/or content item may include using a variety of types of client device capabilities and/or end user senses in particular situations, including to play audio and/or video, to visually display various types of information, etc. In addition, while the display of the indicated information page and content items will in many cases occur on the client device, in at least some embodiments and situations, the client device executing the routine will obtain information to be displayed and then initiate some or all of the actual display activities on one or more other devices of the user or devices that are otherwise accessible to the client device. Adapting display of an indicated information page and/or content item may further include various activities in various embodiments, such as to enable a user interface for the displayed information that is based on tilt capabilities or other sensor-based capabilities of the client device, to enable a user interface for the displayed information that is based on multi-touch display of the client device, to accommodate display of the information on a display size different than that for which the indicated information page and/or content item are designed or intended, etc.

After block 825, the routine continues to block 835 to optionally enable the end user to interact with particular displayed content items, and to perform operations corresponding to such interactions, including to optionally modify the display accordingly. As is indicated by the dashed arrow, a variety of user interactions may in some cases occur without changing the particular information page that is being displayed. Conversely, if the end user selects a link to another information page that is displayed on the indicated information page, or the user otherwise specifies to load another information page, the routine may continue to block 895 and then back to 805 to perform those operations.

Thus, after the end user completes any optional interactions with the displayed indicated information page in block 835, the routine continues to block 895 to determine whether to continue, such as until an explicit instruction to terminate is received. If it is determined to continue, the routine returns to block 805, and otherwise continues to block 899 and ends.

Those skilled in the art will also appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method for selecting promotional information for display, the method comprising:
    receiving, by a configured computing system of a content item selection service that communicates with computer systems of a separate online retailer over one or more computer networks, information about search results generated by the online retailer in response to a search request by a user, wherein the search results indicate multiple products available to be acquired from the online retailer and are included in a search results Web page from the online retailer to be displayed to the user on a client device of the user;
    automatically determining, by the configured computing system of the content item selection service, a product category to associate with the search request by analyzing information about multiple product categories of the indicated products in the search results;
    sending, by the configured computing system of the content item selection service, one or more electronic communications that have information about one or more additional products to include as part of the search results Web page displayed to the user, wherein the one or more additional products are distinct from the indicated products in the search results and are selected from the determined product category by the configured computing system;
    determining, by the configured computing system of the content item selection service and based at least in part on the determining of the product category to associate with the search request, to further associate the determined product category with one or more additional Web pages that are displayed to the user on the client device as a result of one or more interactions by the user with the search results included in the displayed search results Web page, including to send one or more additional electronic communications with information about one or more further products selected from the determined product category to include as part of the one or more additional Web pages displayed to the user; and
    updating, by the configured computing system of the content item selection service, and based at least in part on one or more further interactions by the user with the displayed one or more additional Web pages, an association for the search request from the determined product category to a different product category, for use with later searches by other users using the search request.

2. The method of claim 1 wherein the search request includes one or more search terms, and wherein the method further comprises storing a mapping of the one or more search terms to the determined product category, and using the stored mapping with the later searches by the other users that use the search request including the one or more search terms.

3. The method of claim 2 wherein the using of the stored mapping further includes:
    after the storing of the mapping, receiving information about other search results generated by the online retailer in response to a second search request by a second user that includes at least one of the one or more search terms, the other search results to be displayed to the second user as part of a second search results Web page that indicates one or more products available to be acquired from the online retailer; and
    automatically identifying one or more additional products to recommend to the second user as part of the second search results Web page based at least in part on the stored mapping, the additional products to recommend to the second user as part of the second search results Web page being distinct from the indicated products of the second search results Web page and being part of the determined product category.

4. The method of claim 2 wherein the updating of the association for the search request from the determined product category to the different product category includes receiving information about later online activities of the user related to at least one of the multiple products that is part of the different product category, and updating the stored mapping to further associate the one or more search terms with the different product category.

5. The method of claim 4 wherein the receiving of the information about the later online activities of the user includes at least one of dynamically tracking actions taken by the user after the sending of the one or more electronic communications and of analyzing log information from the online retailer that includes information about the actions taken by the user.

6. The method of claim 2 wherein the automatic determining of the product category further includes analyzing information about actions previously taken by other users involving products that are part of the determined product category, the previously taken actions occurring after prior search results were provided to the other users for prior searches by the other users that each included at least one of the one or more search terms.

7. The method of claim 6 wherein the previously taken actions include actions related to purchasing one or more products that are part of the determined product category.

8. The method of claim 6 wherein the previously taken actions include selections made by the other users to obtain additional information about one or more products that are part of the determined product category.

9. The method of claim 1 wherein the analyzing of the information about the multiple product categories of the indicated products in the search results includes analyzing product metadata obtained from the online retailer about at least one product of the indicated products, the product metadata including information regarding at least one product category associated with each of the at least one indicated products.

10. The method of claim 1 wherein the sending of the information about the one or more additional products includes sending multiple content pieces of a plurality of content types, the plurality of content types including text, images, video clips and audio clips.

11. The method of claim 1 wherein the determining of the product category to associate with the search request includes determining one or more associated product categories for the search request, wherein the search request includes one or more search terms, and wherein the method further comprises obtaining information about multiple prior searches by the user that each includes at least one of the one or more search terms and that are associated with the determined one or more associated product categories, and storing, by the configured computing system, mapping information that associates the user with the determined one or more associated product categories based on the search request and on the multiple prior searches, to enable subsequent actions to be taken for the user corresponding to the determined one or more associated product categories.

12. The method of claim 11 wherein the method further comprises adding, by the configured computing system, the user to a group of multiple users that is associated with the determined one or more associated product categories, and electronically providing, by the configured computing system, information about the group of users to an external entity to enable the external entity to take one or more further actions involving the users of the group and corresponding to the determined one or more associated product categories.

13. The method of claim 12 wherein the method further comprises, before the adding of the user to the group of multiple users, automatically determining, by the configured computing system, at least some of the multiple users for the group by analyzing information about actions previously taken by the at least some users involving products that are part of the determined one or more associated product categories.

14. The method of claim 1 wherein the method further comprises, after display of the search results Web page to the user:
identifying, by the configured computing system, the one or more additional Web pages displayed to the user after the search results Web page, wherein the one or more additional Web pages do not include any search results; and
after the determining to further associate the determined product category with the one or more additional Web pages, providing, by the configured computing system and to one or more other users, content items corresponding to the determined product category for display along with the one or more additional Web pages.

15. The method of claim 1 wherein the method further comprises, after display of the search results Web page to the user:
identifying, by the configured computing system, the one or more additional Web pages displayed to the user after the search results Web page, wherein the one or more additional Web pages are not associated with any product categories before the determining to further associate the determined product category with the one or more additional Web pages; and
after the determining to further associate the determined product category with the one or more additional Web pages, providing, by the configured computing system and to one or more other users, content items corresponding to the determined product category for display along with the one or more additional Web pages.

16. The method of claim 1 wherein the automatic determining of the product category for the search request includes selecting a single associated product category for the search request based at least in part on determining a most frequent product category of the multiple products, wherein the method further comprises storing the association for the search request with the determined product category, and wherein the updating of the association includes updating the stored association.

17. The method of claim 1 wherein the automatic determining of the product category for the search request includes selecting a single associated product category for the search request based at least in part on at least some of the multiple product categories being sub-categories of the single associated product category, wherein the method further comprises storing the association for the search request with the determined product category, and wherein the updating of the association includes updating the stored association.

18. A computing system, comprising:
one or more processors; and
a system that, when executed by at least one of the one or more processors, causes the computing system to:
receive search results that are generated in response to a search request by a user and that indicate multiple items from multiple product categories, wherein the search results are provided by one or more online retailers;
automatically determine one or more additional items to recommend to the user that are distinct from the multiple items indicated in the search results, by automatically determining one product category of the multiple product categories to associate with the search request from analyzing information about the multiple items in the search results, storing an association of the search request with the determined one product category, and selecting the one or more additional items from a plurality of items in the determined one product category;
automatically send one or more electronic communications that have information about the one or more additional items, to cause the additional items to be included as part of a single search results Web page displayed to the user that also includes the search results; and
update, after the sending and based at least in part on one or more interactions by the user with at least one of the displayed single search results Web page or one or more additional Web pages that are subsequently displayed to the user, the stored association of the search request from the determined one product category to a different product category, for use with later searches based at least in part on the search request.

19. The computing system of claim 18 wherein the multiple items are each a product that is associated with one of the multiple product categories, and wherein the automatic determining of the one product category from the multiple product categories includes determining a most frequent product category of the multiple items.

20. The computing system of claim 18 wherein the multiple items are each a product that is associated with one of the multiple product categories, and wherein the automatic determining of the one product category from the multiple product categories includes determining the one product category based at least in part on one or more other product categories of the multiple product categories being sub-categories of the one product category.

21. A non-transitory computer-readable medium having stored contents that cause a computing system of a content item selection service to automatically perform a method, the method comprising:
  receiving, by the computing system, information about search results generated by an online retailer in response to a search request by a user, wherein the search results are to be displayed to the user as part of a single search results Web page and include multiple products from multiple product categories that are available to be acquired from the online retailer, and wherein the content item selection service is separate from the online retailer;
  automatically determining, by the computing system and before the search results are displayed to the user as part of the single search results Web page, a product category of the multiple product categories to associate with the search request, the determining including analyzing information about the multiple products in the search results and identifying a most frequent product category to which the multiple products belong;
  automatically identifying, by the computing system, one or more additional products from the determined product category to display to the user along with the search results as part of the single search results Web page, the additional products being distinct from the multiple products in the search results;
  sending, by the computing system, one or more electronic communications that have information about the identified one or more additional products to include as part of the single search results Web page displayed to the user;
  determining, by the computing system and based at least in part on the determining of the product category to associate with the search request, to further associate the determined product category with one or more additional Web pages that are displayed to the user as a result of one or more interactions by the user with the search results included in the displayed single search results Web page; and
  sending, by the computing system, one or more additional electronic communications with information about one or more further products selected from the determined product category to include as part of the one or more additional Web pages displayed to the user.

22. The non-transitory computer-readable medium of claim 21 wherein the search request includes one or more search terms, and wherein the method further comprises storing, by the computing system, a mapping of the one or more search terms to the determined product category.

23. The non-transitory computer-readable medium of claim 22 wherein the stored contents include software instructions that, when executed, further cause the computing system to:
  after the storing of the mapping, receive information about a second search request by a second user that includes at least one of the one or more search terms; and
  automatically identify, based at least in part on the stored mapping and on the at least one search term, one or more additional products to recommend to the second user in response to the second search request, the additional products to recommend being part of the determined product category.

24. The non-transitory computer-readable medium of claim 22 wherein the method further comprises, after the sending of the one or more electronic communications, receiving information about later online activities of the user related to at least one of the multiple products that is part of an additional product category separate from the determined product category, and updating the stored mapping to further associate the one or more search terms with the additional product category.

25. The non-transitory computer-readable medium of claim 24 wherein the receiving of the information about the later online activities of the user related to the at least one product includes at least one of dynamically tracking actions taken by the user after the sending of the one or more electronic communications or of analyzing log information from the online retailer that includes information about the actions taken by the user.

26. The non-transitory computer-readable medium of claim 21 wherein the search request includes one or more search terms, and wherein the automatic determining of the product category further includes using information about actions previously taken by other users involving products that are part of the determined product category, the previously taken actions occurring after prior search results were provided to the other users for prior searches by the other users that each included at least one of the one or more search terms.

27. The non-transitory computer-readable medium of claim 26 wherein the previously taken actions include actions related to purchasing one or more products that are part of the determined product category.

28. The non-transitory computer-readable medium of claim 26 wherein the previously taken actions include selections made by the other users to obtain additional information about one or more products that are part of the determined product category.

29. The non-transitory computer-readable medium of claim 26 wherein the automatic determining of the product category further includes not selecting other product categories based at least in part on the prior search results including one or more further products from the other product categories and on the previously taken actions of the other users not being based on the one or more further products.

30. The non-transitory computer-readable medium of claim 26 wherein the automatic determining of the product category further includes not selecting other product categories based at least in part on the prior search results including one or more further products from the other product categories and on the previously taken actions of the other users being based on the one or more further products.

31. The non-transitory computer-readable medium of claim 26 wherein the automatic identifying of the one or more additional products further includes not including one or more further products in the identified additional products based at least in part on the prior search results including the one or more further products and on the previously taken actions of the other users not being based on the one or more further products.

32. The non-transitory computer-readable medium of claim 26 wherein the automatic identifying of the one or more additional products further includes not including one or more further products in the identified additional products based at least in part on the prior search results including the one or more further products and on the previously taken actions of the other users being based on the one or more further products.

33. The non-transitory computer-readable medium of claim 21 wherein the analyzing of the information about the multiple products in the search results includes analyzing product metadata obtained from the online retailer about at least one of the multiple products.

34. The non-transitory computer-readable medium of claim 21 wherein the sending of the one or more electronic communications includes sending one or more of text, images, video clips or audio clips.

35. The non-transitory computer-readable medium of claim 21 wherein the search request includes one or more search terms, and wherein the method further comprises obtaining information about multiple prior searches by the user that each includes at least one of the one or more search terms and that are associated with the determined product category, and storing, by the computing system, mapping information indicating an association of the user with the determined product category based on the search request and on the multiple prior searches, to enable subsequent actions to be taken for the user corresponding to the association of the user with the determined product category.

36. The non-transitory computer-readable medium of claim 35 wherein the method further comprises adding, by the computing system, the user to a group of multiple users that is associated with the determined product category, and electronically providing, by the computing system, information about the group of users to an external entity to enable the external entity to take one or more further actions involving the users of the group and corresponding to the determined product category.

37. The non-transitory computer-readable medium of claim 36 wherein the method further comprises, before the adding of the user to the group of multiple users, automatically determining, by the computing system, at least some of the multiple users for the group by analyzing information about actions previously taken by the at least some users involving products that are part of the determined product category.

38. The non-transitory computer-readable medium of claim 21 wherein the method further comprises, after display of the search results Web page to the user:
identifying, by the computing system, the one or more additional Web pages displayed to the user after the search results Web page, the one or more additional Web pages not including any search results;
and wherein the sending of the one or more additional electronic communications includes, after the further associating of the determined product category with the one or more additional Web pages and by the computing system, sending content items corresponding to the determined product category for display to one or more other users along with the one or more additional Web pages.

39. The non-transitory computer-readable medium of claim 21 wherein the method further comprises, after display of the search results Web page to the user:
identifying, by the computing system, the one or more additional Web pages displayed to the user after the search results Web page, the one or more additional Web pages not being associated with any product categories;
and wherein the sending of the one or more additional electronic communications includes, after the further associating of the determined product category with the one or more additional Web pages and by the computing system, sending content items corresponding to the determined product category for display to one or more other users along with the one or more additional Web pages.

* * * * *